United States Patent
Horesh et al.

(10) Patent No.: US 11,531,902 B2
(45) Date of Patent: Dec. 20, 2022

(54) GENERATING AND MANAGING DEEP TENSOR NEURAL NETWORKS

(71) Applicants: International Business Machines Corporation, Armonk, NY (US); Trustees of Tufts College, Medford, MA (US); Ramot at Tel-Aviv University Ltd., Tel Aviv (IL)

(72) Inventors: Lior Horesh, North Salem, NY (US); Elizabeth Newman, Sudbury, MA (US); Misha E. Kilmer, Medfield, MA (US); Haim Avron, Tel Aviv (IL)

(73) Assignees: INTERNATIONAL BUSINESS MACHINES CORPORATION, Armonk, NY (US); TRUSTEES OF TUFTS COLLEGE, Boston, MA (US); RAMOT AT TEL-AVIV UNIVERSITY LTD., Tel Aviv (IL)

( * ) Notice: Subject to any disclaimer, the term of this patent is extended or adjusted under 35 U.S.C. 154(b) by 894 days.

(21) Appl. No.: 16/189,744

(22) Filed: Nov. 13, 2018

(65) Prior Publication Data
US 2020/0151580 A1 May 14, 2020

(51) Int. Cl.
*G06N 3/12* (2006.01)
*G06N 3/08* (2006.01)
*G06N 3/04* (2006.01)

(52) U.S. Cl.
CPC ........... *G06N 3/126* (2013.01); *G06N 3/0481* (2013.01); *G06N 3/084* (2013.01)

(58) Field of Classification Search
CPC ...... G06N 3/126; G06N 3/084; G06N 3/0481; G06N 3/063
See application file for complete search history.

(56) References Cited

U.S. PATENT DOCUMENTS 10,089,556 B1 * 10/2018 Xu ..................... G06K 9/00771
2017/0132513 A1   5/2017 Yu et al.
(Continued)

OTHER PUBLICATIONS

Mei et al. "Invariant Feature Extraction for Image Classification Via Multi-Channel Convolutional Neural Network", ISISPCS, 2017, pp. 491-495.*

(Continued)

*Primary Examiner* — Li Wu Chang
(74) *Attorney, Agent, or Firm* — Amin, Turocy & Watson, LLP

(57) ABSTRACT

Techniques for generating and managing, including simulating and training, deep tensor neural networks are presented. A deep tensor neural network comprises a graph of nodes connected via weighted edges. A network management component (NMC) extracts features from tensor-formatted input data based on tensor-formatted parameters. NMC evolves tensor-formatted input data based on a defined tensor-tensor layer evolution rule, the network generating output data based on evolution of the tensor-formatted input data. The network is activated by non-linear activation functions, wherein the weighted edges and non-linear activation functions operate, based on tensor-tensor functions, to evolve tensor-formatted input data. NMC trains the network based on tensor-formatted training data, comparing output training data output from the network to simulated output data, based on a defined loss function, to determine an update. NMC updates the network, including weight and bias parameters, based on the update, by application of tensor-tensor operations.

20 Claims, 10 Drawing Sheets

(56) References Cited

U.S. PATENT DOCUMENTS

| | | |
|---|---|---|
| 2018/0204117 A1 | 7/2018 | Brevdo |
| 2019/0084151 A1* | 3/2019 | Bai .................... B25J 9/1671 |
| 2019/0114511 A1* | 4/2019 | Gao .................... G16B 40/00 |
| 2019/0266246 A1* | 8/2019 | Wang .................... G06F 40/58 |

OTHER PUBLICATIONS

Haber et al. "Stable architectures for deep neural networks", IOP Inverse Problems, Jan. 2018, pp. 22.*
Rövid et al., "On Tensor-Product Model Based Representation of Neural Networks," INES 2011, 15th International Conference on Intelligent Engineering Systems, Jun. 2011, IEEE, 2011, pp. 69-72, 4 pages.
Schulman et al., "Gradient Estimation Using Stochastic Computation Graphs," Advances in Neural Information Processing Systems, 2015, 9 pages.
Trivedi et al., "Know-Evolve: Evolutionary Knowledge Network for Temporal Reasoning in Dynamic Knowledge Graphs," arXiv:1705.05742v2, May 17, 2017, 14 pages.
Ascher, "Numerical methods for evolutionary differential equations," Several Space Variables and Splitting Methods, Chapter 9, 2010, pp. 275-325, 51 pages.
Atkinson, "An Introduction to Numerical Analysis," University of Iowa, Second Edition, 1989, 663 pages.
Bengio et al., "Learning long-term dependencies with gradient descent is difficult," IEEE Transactions on Neural Networks, vol. 5, No. 2, Mar. 1994, pp. 157-166, 10 pages.
Brooks et al., "Handbook of Markov Chain Monte Carlo," Chapman and Hall/CRC, Handbooks of Modern Statistical Methods, 2011, 620 pages.
Chien et al., "Tensor-factorized neural networks," IEEE Transactions on Neural Networks, vol. 29, Issue 5, 2018, 14 pages.
Denil et al., "Predicting Parameters in Deep Learning," arXiv:1306.0543v2 [cs.LG], Oct. 27, 2014, 9 pages.
Goodfellow et al. "Deep learning," MIT Press, 2016, 643 pages.
Haber et al., "Stable Architectures for Deep Neural Networks," arXiv:1705.03341v2 [cs.LG], Jun. 30, 2017, 21 pages.
Haber et al., "Learning Across Scales—Multiscale Methods for Convolution Neural Networks," arXiv:1703.02009v2 [cs.NE], Jun. 22, 2017, 12 pages.
Hao et al., "Nonnegative Tensor Decomposition," Compressed Sensing & Sparse Filtering, Signals and Communication Technology, 2014, pp. 123-148, 26 pages.
Hao et al., "Facial Recognition Using Tensor-Tensor Decompositions," SIAM Journal of Imaging Sciences, 2013, pp. 437-463, 25 pages.
He et al., "Deep Residual Learning for Image Recognition," arXiv:1512.03385v1 [cs.CV], Dec. 10, 2015, 12 pages.
Hinton et al., "Deep neural networks for acoustic modeling in speech recognition: The shared views of four research groups," IEEE Signal Processing Magazine, Nov. 2012, 16 pages.
Kernfeld et al., "Tensor-Tensor Products with Invertible Linear Transforms," Linear Algebra and its Applications, Jul. 28, 2014, 25 pages.
Kilmer et al., "Third Order Tensors as Operators on Matrices: A Theoretical and Computational Framework With Applications in Imaging," SIAM Journal on Matrix Analysis and Applications, 2013, pp. 148-172, 24 pages.
Kilmer et al., "Factorization Strategies for Third-Order Tensors," Linear Algebra and its Applications, 2011, pp. 641-658, 20 pages.
Krizhevsky et al., "Learning Multiple Layers of Features from Tiny Images," 2009, 60 pages.
Krizhevsky et al., "Imagenet classification with deep convolutional imagenet classification with deep convolutional neural networks," Proceedings of the 25th International Conference on Neural Information Processing Systems, 2012, pp. 1091-1105, 9 pages.
Lecun et al., "Gradient-based learning applied to document recognition," Proceedings of the IEEE, 1998, 46 pages.
Lecun et al., "The mnist database of handwritten digits," 1998, 8 pages.
Lund, et al., "The Tensor T-Function: A Definition for Functions of Third-Order Tensors," arXiv:1806.07261v1, Jun. 19, 2018, 16 pages.
Martin et al., "An Order-p Tensor Factorization With Applications in Imaging," SIAM Journal of Scientific Computing, vol. 35, No. 1, 2013, pp. A474-A490, 17 pages.
Mhaskar et al., "Deep vs. Shallow Networks: an Approximation Theory Perspective," arXiv:1608.03287v1 [cs.LG], Aug. 10, 2016, 16 pages.
Newman et al., "Image classification using local tensor singular value decompositions," arXiv:1706.09693v1 [stat.ML], Jun. 29, 2017, 5 pages.
Neilsen, "Neural networks and deep learning," http://neuralnetworksanddeeplearning.com/, 2017, 278 pages.
Novikov et al., "Tensorizing Neural Networks," arXiv:1509.06569v2, Dec. 20, 2015, 9 pages.
Papernot et al., "The Limitations of Deep Learning in Adversarial Settings," arXiv:1511.07528v1 [cs.CR], Nov. 24, 2015, 16 pages.
Paszke et al., "Automatic differentiation in PyTorch," 31st Conference on Neural Information Processing Systems (NIPS), 2017, 4 pages.
Phan et al., "Tensor decompositions for feature extraction and classification of high dimensional datasets," Nonlinear theory and its applications, IEICE, vol. 1, No. 1, 2010, pp. 37-68, 32 pages.
Rumelhart et al., "Learning representations by back-propagating errors," Nature, vol. 323, Oct. 9, 1986, pp. 533-536, 4 pages.
Shalev-Shwartz et al., "Failures of Gradient-Based Deep Learning," arXiv:1703.07950v2 [cs.LG], Apr. 26, 2017, 33 pages.
Soltani et al., "A Tensor-Based Dictionary Learning Approach to Tomographic Image Reconstruction," arXiv:1506.04954v1 [cs.CV], Jun. 8, 2015, 29 pages.
Stoudenmire et al., "Supervised Learning with Tensor Networks," 30th Conference on Neural Information Processing Systems (NIPS), 2016, 9 pages.
Zhang et al., "Novel methods for multilinear data completion and de-noising based on tensor-SVD," CVPR, 2014, 8 pages.
Vasilescu et al., "Multilinear Subspace Analysis of Image Ensembles," IEEE Conference on Computer Vision and Pattern Recognition (CVPR'03), Jun. 2003, vol. 2, pp. 93-99, 7 pages.
Shi et al., "Multi-target Tracking with Motion Context in Tensor Power Iteration," Computer Vision Foundation, 2014, 8 pages.
"Tensorflow," https://www.tensorflow.org/, 5 pages.
De Silva et al., "Tensor Rank and the Ill-Posedness of the Best Low-Rank Approximation Problem," arXiv:math/0607647, Apr. 1, 2008, 44 pages.
Carroll et al., "Analysis of Individual Differences in Multidimensional Scaling Via an N-Way Generalization of "Eckart-Young" Decomposition," Psychometriko, vol. 35, No. 3, Sep. 1970, 35 pages.
De Lathauwer et al., "A Multilinear Singular Value Decomposition," SIAM J. Matrix Anal. Appl., vol. 21, No. 4, 2000, pp. 1253-1278, 27 pages.
Rajih et al., "Enhanced Line Search: A Novel Method to Accelerate Parafac," SIAM J. Matrix Anal. Appl., vol. 30, No. 3, 2000, pp. 1128-1147, 21 pages.
Ivanov et al., "Head Pose Estimation Using Multilinear Subspace Analysis for Robot Human Awareness," IEEE 12th International Conference on Computer Vision Workshops, ICCV Workshops, 2009, 7 pages.
Hitchcock, "The Expression of a Tensor or a Polyadic as a Sum of Products," Journal of Mathematics and Physics, 1927, pp. 164-189, 26 pages.
Cichocki et al., "Nonnegative Matrix and Tensor Factorizations," Applications to Exploratory Multi-way Data Analysis and Blind Source Separation, 2009, 205 pages.
Harshman, "Foundations of the Parafac Procedure: Models and Conditions for an "Explanatory" Multimodal Factor Analysis," UCLA Working Papers in Phonetics, 1970, 84 pages.
Tucker, "Some Mathematical Notes on Three-Mode Factor Analysis," Psychometrika, vol. 31, No. 3, Sep. 1966, 33 pages.

* cited by examiner

GENERATING AND MANAGING DEEP TENSOR NEURAL NETWORKS

BACKGROUND

The subject disclosure relates to neural networks, and more specifically, to generating and managing neural networks.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can facilitate generating and managing neural networks, such as, for example, deep tensor neural networks, are provided.

According to an embodiment, a system can comprise a memory that stores computer-executable components; and a processor, operatively coupled to the memory, that executes computer-executable components. The computer-executable components can comprise a network component that generates a network comprising a graph of nodes connected via weighted edges. The computer-executable components also can include a network management component that evolves tensor-formatted input data based on a defined tensor-tensor layer evolution rule, wherein the network generates output data based on the evolution of the tensor-formatted input data.

Another embodiment, a computer-implemented method that can comprise generating, by a system operatively coupled to a processor, a network comprising a graph of nodes connected via weighted edges. The computer-implemented method also can include evolving, by the system, tensor-formatted input data based on a defined tensor-tensor layer evolution rule, wherein the network generates output data based on the evolving of the tensor-formatted input data.

A further embodiment relates to a computer program product that facilitates creating a deep tensor neural network, the computer program product comprising a computer readable storage medium having program instructions embodied therewith. The program instructions are executable by a processor to cause the processor to create a deep tensor neural network comprising a graph of nodes connected via weighted edges. The program instructions also are executable by the processor to cause the processor to evolve tensor-structured input data applied to the deep tensor neural network based on a defined tensor-tensor layer evolution rule, wherein the deep tensor neural network generates output data based on the evolving of the tensor-structured input data.

These and other features will become apparent from the following detailed description of illustrative embodiments thereof, which is to be read in connection with the accompanying drawings.

DETAILED DESCRIPTION

Figure 1:
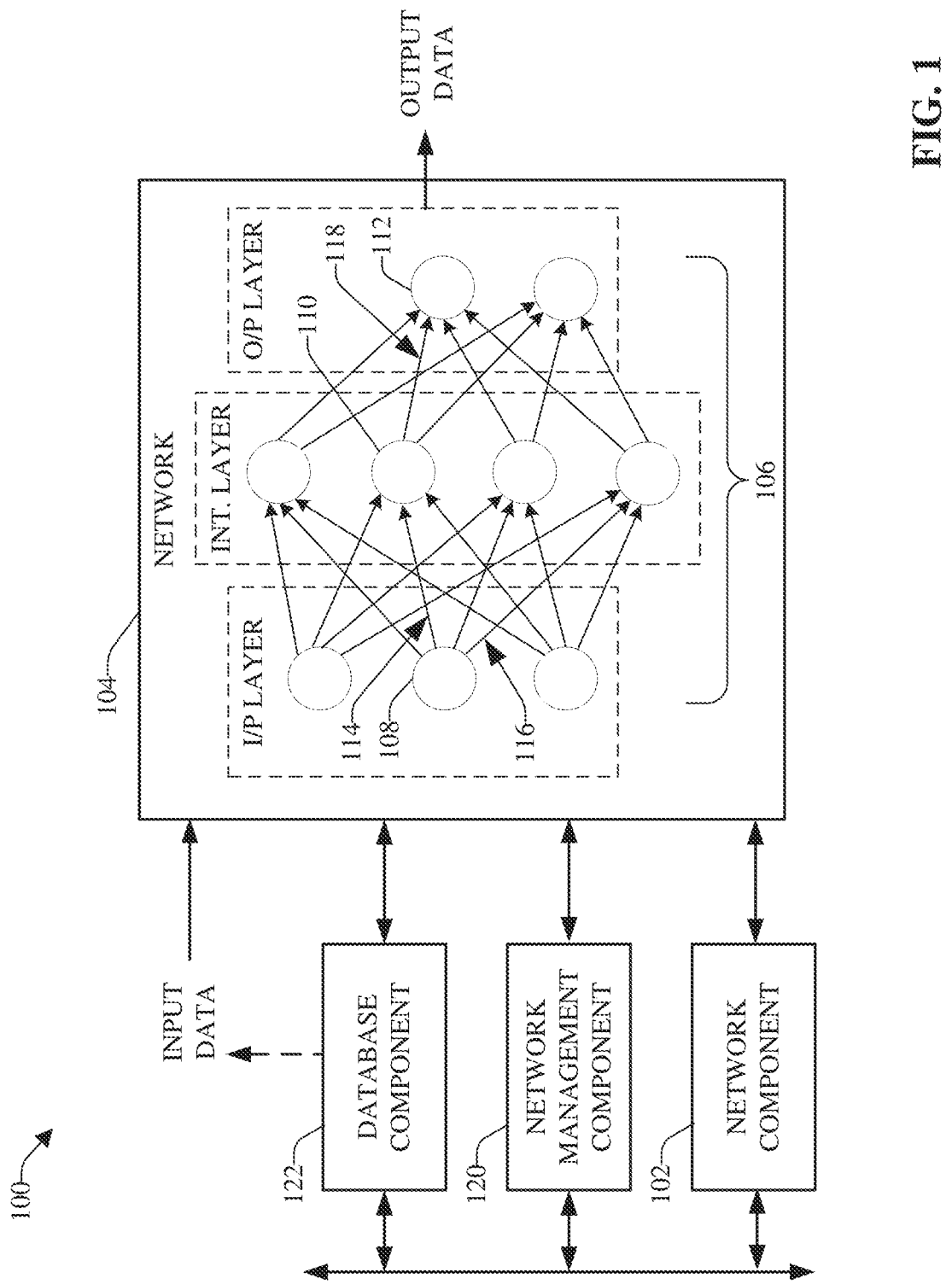
FIG. 1 illustrates a block diagram an example, non-limiting system that can generate and manage neural networks (e.g., deep tensor neural networks) in accordance with various embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A substantial amount of real world data is inherently multi-dimensional. Also, many operators and models can be natively multi-way. There are various types of high-dimensional applications that can use multi-dimensional data. For instance, machine vision can be utilized to facilitate understanding the world in three dimensions (3-D) and enabling understanding of certain phenomena, such as perspective, occlusions, and illumination. Also, latent semantic tensor indexing can involve indexing and information retrieval with regard to, for example, common terms versus entries versus parts, and co-occurrence of terms. Medical imaging can involve 3-D (spatio) and four-dimensional (4-D) (spatio-temporal) correlations. Further, video surveillance and motion signature can relate to two-dimensional (2-D) images plus a third dimension of time, and 3-D/4-D motion trajectory (e.g., self-driving vehicles).

There can be various challenges for neural networks in dealing with multi-dimensional data. Artificial neural networks addressing multi-dimensional data can be challenged by a number of factors. For example, there can be storage issues, as both the data and the feature space can become excessively large. This can be particularly limiting if local processing on a mobile device is desired.

As another example, there can be issues with regard to computation and scalability. Computation (e.g., computation relating to training or simulation) associated with neural networks for multi-dimensional objects often can be a significant bottleneck in processing. Some algorithms can be more amenable than other algorithms to distributed (e.g., low communication) computation.

Small data and limited relevant data can present certain issues as well. For instance, even when big data is accessible, often only a relatively small part of the big data is relevant to a particular application. Also, acquisition and access to big data can be relatively expensive. Further, there can be issues regarding generalizability. For example, there can be inefficient feature space representation, and an undesirably larger parameter space frequently is desirable, which often can imply over-fitting and poor generalization performance in application.

With regard to matrix-based techniques, matrix-based techniques assuming data vectorization (e.g., matrix principal component analysis (PCA)) generally can be neutral to possible high-dimensional correlations. As data becomes increasingly complex and multi-dimensional, it can be desirable for neural network frameworks to extract features and exploit the inherent structure of the data. It can be desirable for such neural network frameworks to honor the dimensional integrity of the data and the underlying process. A consistent, matrix-mimetic, multi-dimensional framework can be desirable to facilitate improved computation efficiency, desirably rapid stable learning, and ease of use.

Various embodiments disclosed herein relate to techniques for generating and managing deep tensor neural networks are presented. A network component can generate a deep tensor neural network comprising or represented by a graph of nodes connected via weighted edges and activated by a set of non-linear activation functions. The network component can generate the deep tensor neural network based at least in part on information provided by a user, wherein such information can define, or at least partially define, the structure of the deep tensor neural network. For example, the user-provided information can specify or indicate a number of layers of the deep tensor neural network. A network management component can format input data and parameters to generate tensor-formatted input data and tensor-formatted parameters based at least in part on a tensor format (e.g., a tensor structure). The input data can be provided from a database, for example. At least a portion of the input data can be multi-dimensional (e.g., 2-D, 3-D, or 4-D) data. Also, at least a portion of the parameters (e.g., initial parameters) can be parameters provided by the user.

The network management component can extract features from the tensor-formatted input data based at least in part on the tensor-formatted parameters. The network management component can evolve the tensor-formatted input data and/or the parameters associated with the network based at least in part on a defined tensor-tensor layer evolution rule. The deep tensor neural network can generate output data based at least in part on the evolution of the tensor-formatted input data. The weighted edges and non-linear activation functions of the deep tensor neural network can operate, based at least in part on tensor-tensor functions, to evolve the tensor-formatted input data.

In some embodiments, the network management component can apply training data to the deep tensor neural network to facilitate training the deep tensor neural network. The network management component can format the training data to generate tensor-formatted training data based at least in part on the tensor format. The network management component can train the deep tensor neural network based at least in part on the tensor-formatted training data applied to the deep tensor neural network. The deep tensor neural network can generate output training data as an output from the deep tensor neural network based at least in part on the tensor-formatted training data applied as an input to the deep tensor neural network. The network management component can compare the output training data to simulated output data, based at least in part on a defined loss function, to determine an update that can be made to the deep tensor neural network. The update can facilitate enhancing performance, operation, and/or efficiency of the deep tensor neural network. The network management component can update the deep tensor neural network, based at least in part on the update, by application of tensor-tensor operations via back-propagation.

These and other aspects and embodiments of the disclosed subject matter will now be described with respect to the drawings.

FIG. 1 illustrates a block diagram an example, non-limiting system 100 that can generate and manage neural networks (e.g., deep tensor neural networks) in accordance with various embodiments described herein. The system 100 can be utilized to, for example, generate and manage a deep tensor neural network as well as deep tensor neural network learning and simulation.

The system 100 can comprise a network component 102 that can generate a network 104 (e.g., a deep tensor neural network) that can comprise or be represented by a graph of nodes 106. The graph of nodes 106 can include, for example, input nodes, such as node 108, of an input layer (I/P layer), intermediate (e.g., hidden) nodes, such as node 110, of an intermediate layer (int. layer), and output nodes, such as node 112, of an output layer (0/P layer). It is to be appreciated and understood that, while the graph of nodes 106 of the network 104 comprises nine nodes in an example node arrangement with an input layer, one intermediate node layer, and an output layer, as depicted in FIG. 1 in accordance with various embodiments, the graph of nodes 106 can have virtually any desired node arrangement, virtually any desired number of nodes, and virtually any desired number of intermediate node layers.

The nodes (e.g., 108, 110, 112, . . . ) of the graph of nodes 106 can be connected to each other via weighted edges, including, for example, weighted edge 114, weighted edge 116, and weighted edge 118, etc. The graph of nodes 106 of the network 104 can be activated by a set of non-linear activation functions, comprising one or more non-linear activation functions. The network component 102 can generate the network 104 based at least in part on information provided by a user, wherein such information can define, or at least partially define, the structure of the network 104. For example, the user-provided information can specify or indicate a number of layers (e.g., input layer, intermediate node layer(s), output layer) of the network 104. The user-provided information also can define the set of non-linear activation functions.

The system 100 can include a network management component 120 that can manage the network 104. The network management component 120 can format input data and parameters to generate tensor-formatted input data and tensor-formatted parameters based at least in part on a tensor format (e.g., a tensor structure). For instance, the network management component 120 can format the input data and the parameters as tensors based at least in part on the tensor format. The input data can be provided from a database component 122, which can comprise a database of data (e.g., all or a portion of the input data), for example. At least a portion of the input data can be multi-dimensional (e.g., 2-D, 3-D, or 4-D) data. Also, at least a portion of the parameters (e.g., initial parameters) can be parameters provided by the user.

The network management component 120 can apply the tensor-formatted input data to the input nodes (e.g., node 108) of the network 104. The network 104 can extract features from the tensor-formatted input data based at least in part on processing of the tensor-formatted input data by the nodes (e.g., 108, 110, 112, . . . ) of the network 104, and the tensor-formatted parameters. For instance, the graph of nodes 106 of the network 104 can process the tensor-formatted input data and can extract the features from the tensor-formatted input data based at least in part on the tensor-formatted parameters. The features can comprise or relate to, for example, image features, facial features, objects, object features (e.g., shape, size, texture, . . . , of objects), correlations between items of data, and/or other types of features.

In some embodiments, the network management component 120 and/or the network 104 can facilitate extracting the features of the input data from the tensor-formatted input data in parallel. For example, the network 104 (e.g., as managed by the network management component 120) can extract a first feature of the input data from the tensor-formatted input data in parallel with extracting of a second feature of the input data from the tensor-formatted input data, and so on.

The network management component 120 can evolve the tensor-formatted input data and/or the tensor-formatted parameters associated with the network 104 based at least in part on a defined tensor-tensor layer evolution rule. The network 104 can generate output data (e.g., which can be output from the output nodes, such as node 112) based at least in part on the evolution of the tensor-formatted input data (e.g., based at least in part on the evolution of the tensor-formatted input data through the network 104). The weighted edges (e.g., 114, 116, 118, . . . ) and the set of non-linear activation functions of the network 104 can operate, based at least in part on tensor-tensor functions, to evolve the tensor-formatted input data through the network 104 to yield (e.g., produce) the output data.

In some embodiments, the network management component 120 can evolve the parameters, based at least in part on the defined tensor-tensor layer evolution rule, to facilitate determining updates to the parameters and updating the parameters to facilitate training and improving the performance of the network 104, as more fully described herein. For instance, the network management component 120 can back-propagate information, based at least in part on the output data and an objective function (e.g., an error or loss function0, to facilitate determining updates for the parameters, such as an update for the weights of the weighted edges of the network 104 and an update for the biases of the network 104, as more fully described herein.

Figure 2:
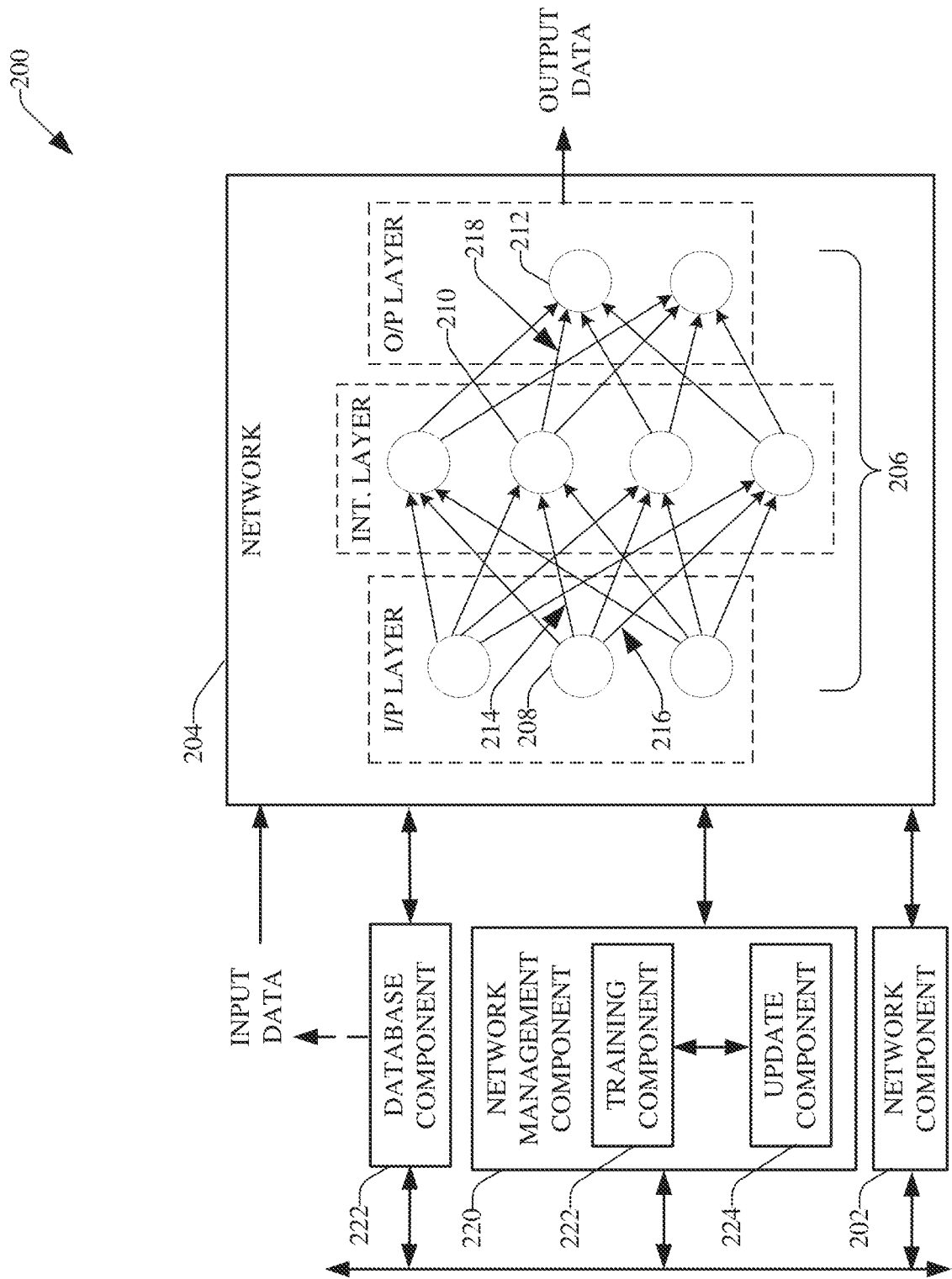
FIG. 2 depicts a block diagram an example, non-limiting system that can train and manage deep tensor neural networks in accordance with various embodiments described herein.
Figure 3:
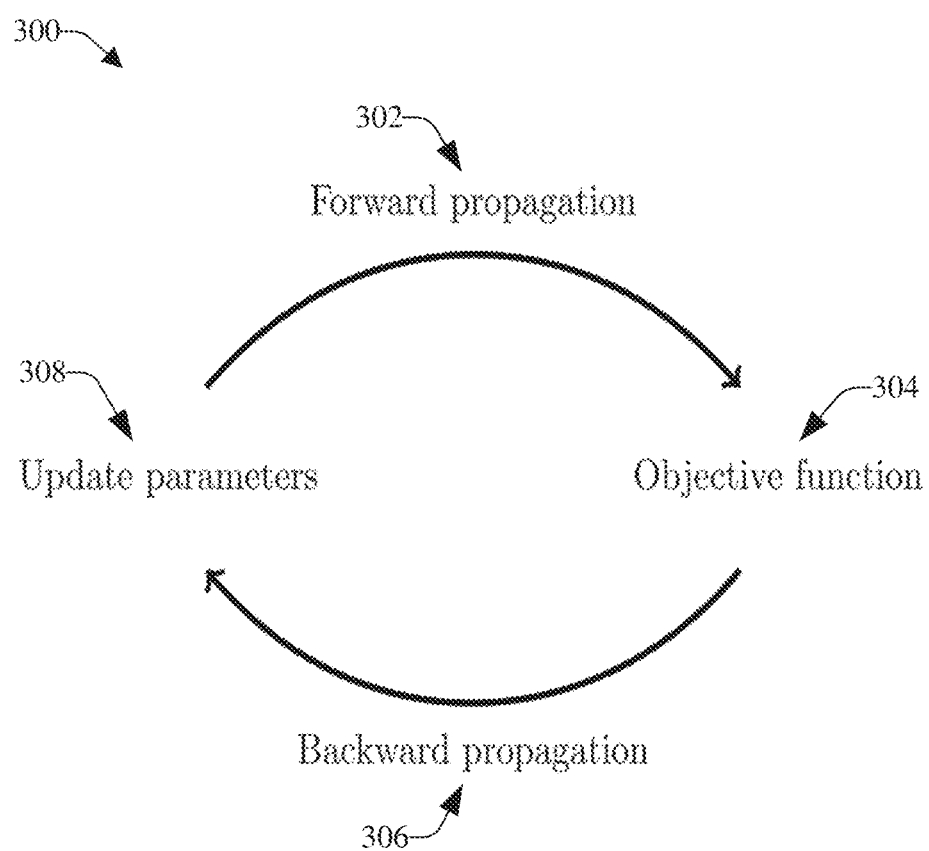
FIG. 3 presents a diagram of an example process flow for processing data in a network and updating parameters of the network in accordance with various embodiments described herein.

Turning to FIGS. 2 and 3, FIG. 2 depicts a block diagram an example, non-limiting system 200 that can train and manage deep tensor neural networks in accordance with various embodiments described herein. FIG. 3 presents a diagram of an example process flow 300 for processing data in a network and updating parameters of the network in accordance with various embodiments described herein. Repetitive description of like elements employed in other embodiments described herein is or may be omitted for sake of brevity.

The system 200 can comprise a network component 202 that can generate a network 204 (e.g., a deep tensor neural network) that can comprise or be represented by a graph of nodes 206. The graph of nodes 206 can comprise, for example, input nodes, such as node 208, intermediate (e.g., hidden) nodes, such as node 210, and output nodes, such as node 212. The nodes (e.g., 208, 210, 212, . . . ) of the graph of nodes 206 can be connected to each other via weighted edges, including, for example, weighted edge 214, weighted edge 216, and weighted edge 218, etc. The graph of nodes 206 can be activated by a set of non-linear activation functions.

The system 200 can include a network management component 220 that can train and manage the network 204. The network management component 220 can format input data and parameters to generate tensor-formatted input data and tensor-formatted parameters based at least in part on a tensor format. The input data can be obtained from a database component 222, which can comprise a database of data (e.g., all or a portion of the input data), or another desired data source, for example.

In some embodiments, the network management component 220 can employ a training component 224 that can utilize training data to facilitate training the network 204. The network management component 220 can retrieve the training data from the database component 222 or from another data source. The network management component 220 can format the training data to generate tensor-formatted training data based at least in part on the tensor format.

The training component 224 can apply the tensor-formatted training data to the network 204 to facilitate training the network 204 based at least in part on the tensor-formatted training data applied to the network 204. For instance, the training component 224 can apply the tensor-formatted training data to the input nodes (e.g., node 208) of the network 204. The network 204 can forward propagate (as depicted at reference numeral 302 of FIG. 3) the tensor-formatted training data through the network 204, wherein the network 204 can process the tensor-formatted training data through the various nodes (e.g., 208, 210, 212, . . . ) of the various layers (e.g., input layer, intermediate layer(s), output layer) of the network 204. The network 204 can generate output training data as an output from the network 204 (e.g., from the output nodes, such as node 212) based at least in part on the tensor-formatted training data applied as an input to the network 204 and the tensor-formatted parameters. In some embodiments, the network 204 and/or the network management component 220 (e.g., employing the training component 224) can utilize one or more formulas or equations, as more fully described herein, to forward propagate and process data (e.g., the tensor-formatted training data) to generate output data (e.g., output training data) that can be output from the network 204.

The network management component 220 can compare the output training data to simulated output data (e.g., simulated output data applicable to the network 204), based at least in part on an objective function (e.g., a loss function, such as an error (E) function) (as depicted at reference numeral 304 of FIG. 3), to facilitate determining an update that can be made to the network 204 (e.g., update that can be made to parameters associated with the network 204). The network management component 220 can utilize, for example, the objective function (e.g., an error (E) function), such as more fully described herein, to facilitate determining the amount of difference or error between the output training data and the simulated output data. The update can be utilized to facilitate training and enhancing performance, operation, and/or efficiency of the network 204.

As indicated at reference numerals 306 and 308 of FIG. 3, the network management component 220 can facilitate updating the network 204, based at least in part on the update, by application of tensor-tensor operations via back-propagation. For instance, as indicated at reference numeral 306, employing tensor-tensor operations, the network management component 220 can back-propagate information, including information (e.g., error-related information) relating to the objective function, to facilitate determining the update for the network 204. In some embodiments, the network management component 220 (e.g., employing the training component 224) can perform such back-propagation (e.g., tensor-based back propagation) by performing calculations using certain formulas or equations (e.g., tensor-based back-propagation formulas) to determine updates for certain parameters, such as weight parameters and bias parameters, associated with the network 204, as more fully described herein. The determined parameters (e.g., learnable parameters) can be stored (e.g., in a data store of or associated with the network management component 220) as tensors (e.g., tensor-formatted parameters). It is to be appreciated and understood that, while back propagation is one type of technique that can be employed to facilitate determining updates for, and updating, the network 204 (e.g., weight and bias parameters of the network 204), in other embodiments, the network management component 220 can utilize another desired type(s) of update technique(s) to facilitate determining updates for, and updating, the network 204.

As indicated at reference numeral 308, the network management component 220 can perform the update on the network 204. For instance, employing tensor-tensor operations, the network management component 220 (e.g., employing the training component 224) can update the parameters, including the weight parameters of the weighted edges and/or the bias parameters of the network 204, using the update values determined from the back-propagation of information relating to the network 204 (e.g., update values determined from the calculations performed using the back-propagation formulas). The training component 224 can continue (e.g., the training component 224 can iteratively perform) the training of the network 204, as desired, until a desirably trained network 204 is achieved in accordance with defined network management criteria (e.g., network management criteria relating to training and performance of the network 204). For example, the training component can perform the training of the network 204 until the amount of error of the objective function has been minimized or at least reduced to a desired level in accordance with defined network management criteria.

These and other aspects of the disclosed subject matter will be described further. The system 200, including the network management component 220, can employ a tensor neural network (tNN) framework that can offer a desirable (e.g., enhanced, efficient, improved) paradigm in machine learning. Using the disclosed high-dimensional design of the tNN framework, the system 200 can create a more compact feature space and can extract multidimensional correlations that otherwise can be latent with traditional techniques. The system 200 also can encode more information using fewer parameters (e.g., as compared to matrix-based neural network counterparts), and can support and provide a stable tensor forward propagation scheme that can provide a more robust classification framework (e.g., as compared to matrix-based neural network counterparts) to provide for enhanced classification of information (e.g., image or object classification or recognition). In some embodiments, the network architecture of the system 200 can be based at least in part on a t-product, which is an algebraic formulation to multiply tensors via circulant convolution which inherits mimetic matrix properties. The tNN architecture of the system 200 can be a high-dimensional extension for neural networks. As more fully described herein, the tNN architecture can be a stable tNN which can facilitate more rapid learning because of its reduced, more powerful parameterization.

One of the main bottlenecks in deploying deep neural networks in practical applications can be their storage and computational costs. For instance, the storage, memory bandwidth, and computational resources utilized to train and deploy deep neural networks can make them prohibitive, or at least unfeasible, for smaller devices, such as mobile phones. It can be desirable to develop powerful parameterizations which can be more economical in their use of parameters and implemented more efficiently. Such compressed parameters spaces can accordingly lead to reduced memory and computational costs, and can be more amenable to distributed computation.

With regard to deep neural networks, one reason that so many parameters are utilized is that fully-connected layers of the form $$A_{j+1} = \sigma_j(W_j \times A_j + \vec{b}_j)$$

can use parameters significantly (e.g., highly) inefficiently, wherein $A_j$ can represent the jth layer of the network, $\sigma_j$ can be a non-linear activation function of the jth layer, W can be a weight matrix corresponding to the jth layer, and $\vec{b}_j$ can be a bias term of the jth layer. As more fully described herein, the disclosed subject matter can replace fully-connected layers with more powerful parameterizations. Further, quality parameterizations can extract more meaningful information when data (e.g., relevant data) is limited. By working with an efficient, powerful parameter space, a more generalizable network can be created.

The disclosed subject matter can employ a unique neural network architecture (e.g., tensor neural networks (tNNs)) that can employ tensors (e.g., multidimensional arrays) in place of matrices. The disclosed subject matter, for example, employing the network component 202 and network management component 220, can generate and manage a neural network (e.g., tNN) based at least in part on the t-product. Employing the t-product, tensors utilized by the disclosed subject matter (e.g., network management component 220) can encode information more efficiently than matrix algorithms in applications, such as, for example, facial recognition, tomographic image reconstructions, video completion, image classification, and/or other types of applications.

In accordance with various embodiments, the disclosed subject matter (e.g., employing the network management component 220, the network component 202, and the network 204) can replace the fully-connected layers with layers of the form $$\mathcal{A}_{j+1} = \sigma_j(\mathcal{W}_j * \mathcal{A}_j + \vec{\mathcal{B}}_j)$$

wherein $\mathcal{A}_{j+1}$, $\mathcal{A}_j$, and $\mathcal{W}_j$ can be tensors, $\sigma_j$ can represent a non-linear activation function applied to the jth layer, and the product can be a tensor-tensor product (e.g., represented by the product operator *), such as, for example, a t-product, as more fully described herein. $\mathcal{A}_j$ can represent the jth layer of the network 204. $\mathcal{W}_j$ can be a weight tensor for the jth layer, and can be, represent, or relate to the weight parameter (e.g., for weights for the edges associated with nodes) of the network 204. $\vec{\mathcal{B}}_j$ can be a bias tensor for the jth layer, and can be, represent, or relate to the bias parameter for the network 204.

The disclosed subject matter (e.g., employing the network management component 220, the network component 202, and the network 204) can process data multidimensionally in order to better leverage the structure of the data. The tensor-based neural networks generated and managed by the disclosed subject matter using the disclosed tensor framework can yield a reduced, yet more powerful, network parameterization. Further, the disclosed subject matter, utilizing such tensor framework, can incorporate tensors in a desirable and straightforward manner to achieve the disclosed high-dimensional architecture.

The disclosed subject matter (e.g., employing the network management component 220, the network component 202, and the network 204) can reduce the number of learnable parameters in a tNN due in part to the maintained high-dimensional structure. The disclosed subject matter also can employ a desirable matrix mimetic formulation because the disclosed subject matter can regard tensors as t-linear operators. The disclosed subject matter also can formulate desirable layer evolution rules that can be employed in the multidimensional framework. As a result, the disclosed subject matter can incorporate matrix-based theory while desirably maintaining t-linear integrity (e.g., multidimensional correlations) present in naturally high-dimensional data.

The disclosed subject matter (e.g., employing the network management component 220, the network component 202, and the network 204) can further enhance the neural networks (e.g., tNNs) by utilizing a stable multidimensional framework and stable forward propagation. This can yield a more robust classification scheme, which can be desirable for network generalizability. The disclosed subject matter, utilizing stable tNNs, can obtain a more efficient parameterization, and hence, can learn a classifying function more rapidly than can be realized with an analogous matrix architecture.

By avoiding vectorization of the data, the disclosed tensor framework (e.g., tNN framework) can extract multidimensional correlations from data. It is noted that various embodiments described herein are being described herein with regard to third order tensors (e.g., three-dimensional arrays). However, it is to be appreciated and understood that the techniques of the disclosed subject matter can be extended to higher dimensions (e.g., higher order tensors and dimensions that are greater than third order), and such extensions of the disclosed techniques to higher order tensors and dimensions are part of the disclosed subject matter.

Figure 4:
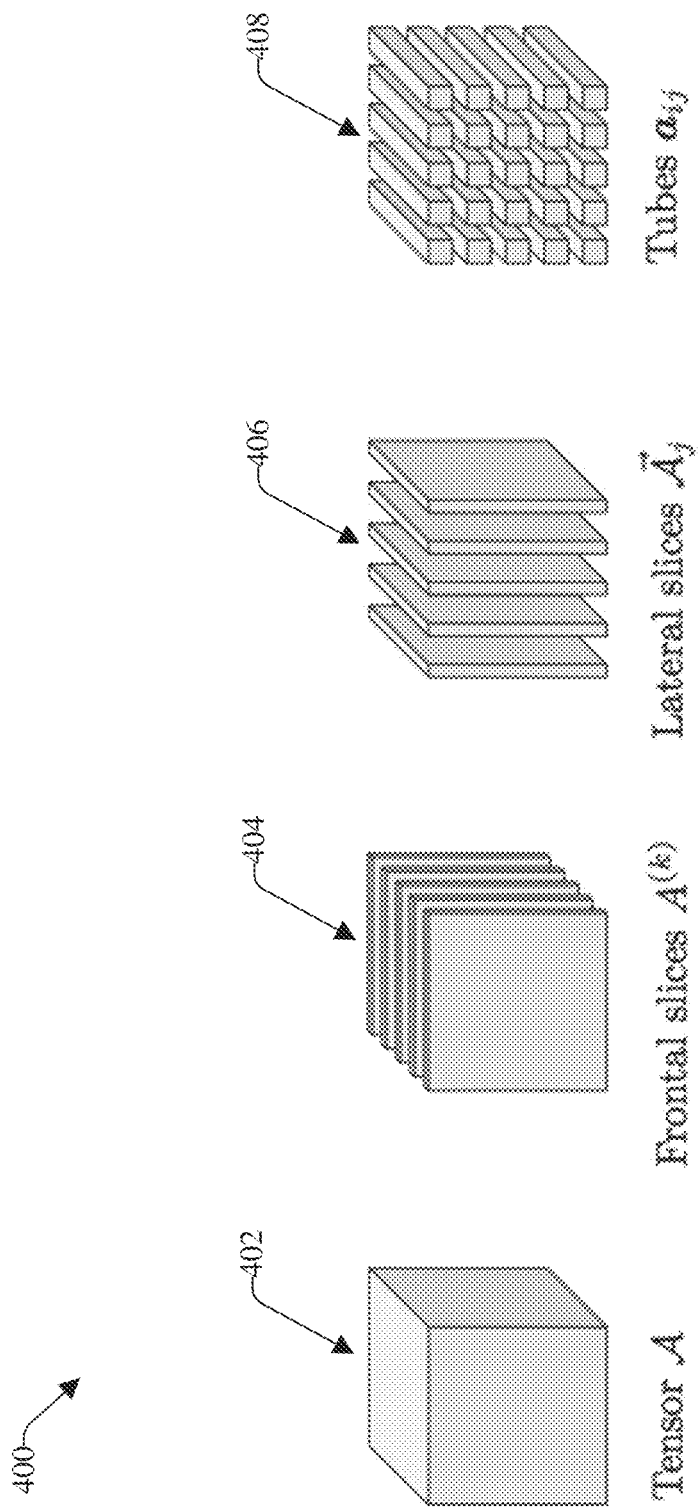
FIG. 4 illustrates an example tensor notation in accordance with various embodiments described herein.

Referring briefly to FIG. 4, FIG. 4 illustrates an example tensor notation 400 in accordance with various embodiments described herein. Let $\mathcal{A}$ be a real-valued $\ell \times m \times n$ tensor (as depicted at reference numeral 402). Fixing the third-dimension, frontal slices $A^{(k)}$ are $\ell \times m$ matrices for k=1, ..., n (as depicted at reference numeral 404). Fixing the second-dimension, lateral slices $\vec{\mathcal{A}}_j$ are $\ell \times n$ matrices oriented along the third dimension for j=1, ..., m (as depicted at reference numeral 406). Fixing the first and second dimensions, tubes $a_{ij}$ are n×1 vectors oriented along the third dimension fort i=1, ..., $\ell$ and j=1, ..., n (as depicted at reference numeral 408). With this tensor notation, the t-product can be introduced, wherein the t-product can be or employ techniques for multiplying tensors via circulant convolution, which can utilize the following functions.

The t-product can employ, for example, Bcirc, unfold, and fold functions that can be defined as follows. Given $\mathcal{A} \in \mathbb{R}^{\ell \times m \times n}$, bcirc($\mathcal{A}$) can be an $\mathcal{A}$ n×m×n block-circulant matrix of the frontal slices (e.g., as depicted at reference numeral 404) defined as follows in Equation (Eq.) (1):

$$bcirc(A) = \begin{pmatrix} A^{(1)} & A^{(n)} & \cdots & A^{(2)} \\ A^{(2)} & A^{(1)} & \cdots & A^{(3)} \\ \vdots & \vdots & \ddots & \vdots \\ A^{(n)} & A^{(n-1)} & \cdots & A^{(1)} \end{pmatrix}.$$  Eq. (1)

The unfold function unfold($\mathcal{A}$) can be defined as the first block-column of Eq. (1), and fold(unfold($\mathcal{A}$))=$\mathcal{A}$.

The t-product can be defined as follows. Given $\mathcal{A} \in \mathbb{R}^{\ell \times p \times n}$ and $\mathcal{B} \in \mathbb{R}^{p \times m \times n}$, the t-product ($\mathcal{C}$) can be defined in accordance with Eq. (2):

$$\mathcal{C} = \mathcal{A} * \mathcal{B} = fold(bcirc(\mathcal{A}) \cdot unfold(\mathcal{B})), \mathcal{C} \in \mathbb{R}^{\ell \times m \times n}.$$  Eq. (2)

For later derivations, it can be useful to consider and/or utilize the following t-product formula, in Eq. (3), for a particular frontal slice:

$$C^{(k)} = A^{(k)} \cdot B^{(1)} + \sum_{i=1}^{k-1} A^{(i)} \cdot B^{(k-i+1)} + \sum_{n=k+1}^{n} A^{(i)} \cdot B^{(n-i+k+1)}$$  Eq. (3)

for k = 1, ..., n.

The t-product can be chosen and employed as the tensor operator because of its efficient implementation. It is to be appreciated and understood though that in accordance with various other embodiments other tensor-tensor can be utilized, such as, for example, the other tensor-tensor as disclosed herein. The discrete Fourier transform (DFT) (e.g., normalized DFT) can block-diagonalize block-circulant matrices. This block-diagonalization can amount to taking one-dimensional Fourier transforms along the third dimension. Thus, the t-product can be implemented as independent matrix multiplications in the Fourier domain as follows, in Eq. (4):

$$\hat{C}^{(k)} = \hat{A}^{(k)} \cdot \hat{B}^{(k)} \text{ for } k=1, \ldots, n$$  Eq. (4)

wherein Á=fft($\mathcal{A}$, □, 3), and fft denotes the fast Fourier transform. The inverse Fourier transform, ifft, can be utilized to compute $\mathcal{C}$, as, for example, $\mathcal{C}$=ifft($\hat{C}$, [ ], 3). This algorithm can be parallelizable (e.g., perfectly parallelizable), and, as a result, can be extremely efficient.

Figure 5:
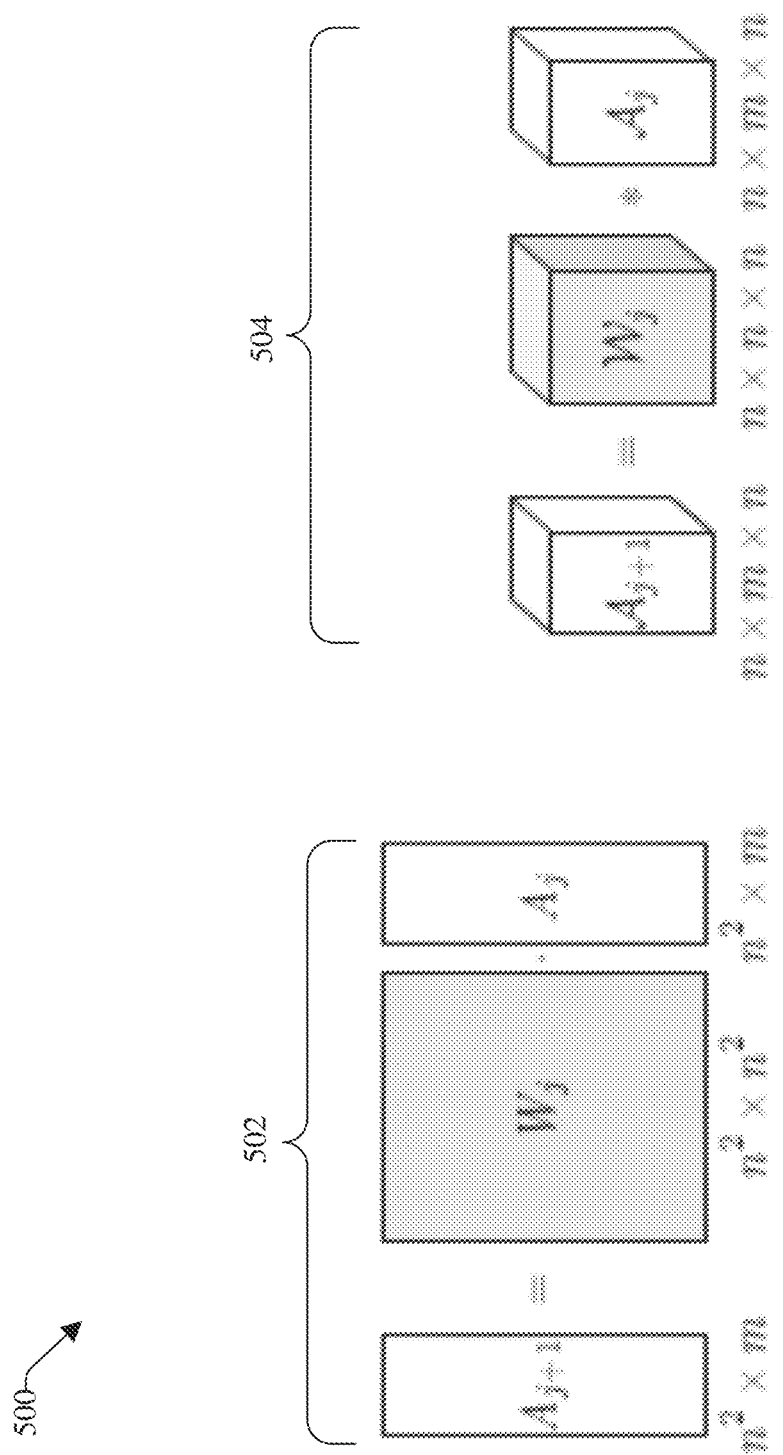
FIG. 5 depicts a diagram of example parameterizations of matrix and tensor products for a fixed number of features in accordance with various embodiments described herein.

Using tensors and the t-product (or another type of tensor-tensor product) in neural networks (e.g., network 204) can be desirable in part because the parameter and feature spaces of the network (e.g., network 204) can be parameterized more efficiently using tensors and the t-product (or another type of tensor-tensor product). Suppose there are samples of two-dimensional data of size n×n. These samples can be vectorized and stored as columns of a matrix $\mathcal{A}$ of size n²×m or the samples can be oriented as lateral slices that can be stored in a tensor $\mathcal{A}$ of size n×n. Referring briefly to FIG. 5, FIG. 5 depicts a diagram of example parameterizations 500 of matrix and tensor products for a fixed number of features in accordance with various embodiments described herein. The example parameterizations 500 can illustrate a comparison of and difference between the parameterization of the weights connecting network layers for matrices and tensors when the number of output features are fixed.

In comparing the matrix weighted connection 502 to the tensor weighted connection 504, it can be observed that the matrix weighted connection 502 can utilize $n^4$ weight parameters, while the tensor weighted connection 504 utilizes only $n^3$. Thus, the search space can be relatively smaller for tensors with the t-product which can be computationally more beneficial and efficient, particularly as the size of the data and network (e.g., network 204) increases. This efficient parameterization of tensors can be even more substantial for higher-dimensional data.

Figure 6:
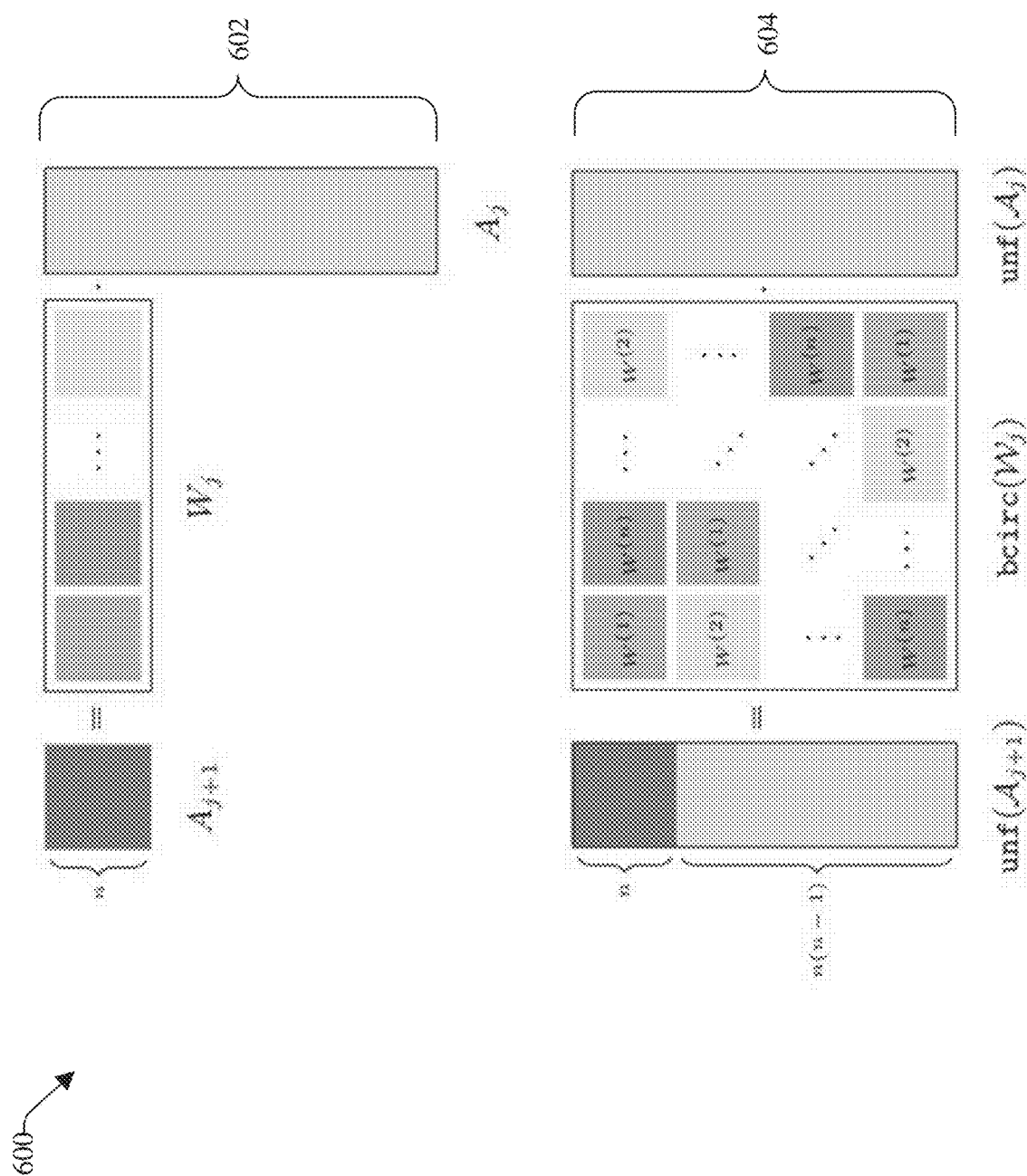
FIG. 6 presents a diagram of an example featurization from matrix and tensor products for a fixed number of parameters in accordance with various embodiments described herein.

Beyond the reduced parameterization for a fixed number of features, employing tensors in neural networks (e.g., tNNs) can provide a more powerful parameterization for a fixed number of parameters. Referring briefly to FIG. 6, FIG. 6 presents a diagram of an example featurization 600 from matrix and tensor products for a fixed number of parameters in accordance with various embodiments described herein. At reference numeral 602 of the example featurization 600, illustrated is $W_j$ split into n×n blocks. At reference numeral 604 of the example featurization 600, illustrated is bcirc($\mathcal{W}_j$) wherein the first block-row=$W_j$. Suppose the number of weight parameters is fixed to be $n^3$. A weight matrix $W_j$ of size n×n² can be compared to a weight tensor $W_j$ of size n×n×n. Using the t-product, such as described and defined herein, the frontal slices of $W_j$ can be chosen such that the first block-row of bcirc($\mathcal{W}_j$) can be equivalent to $W_j$, as depicted at reference numeral 604 in FIG. 6.

As can be observed from FIG. 6, it is demonstrated that for the same number of parameters, the tensor weights can capture the same features as the matrix weights and additional features from applying circulant shifts of the frontal slices. Thus, the disclosed subject matter (e.g., employing the network management component 220 and network 204), using tensors and the t-product, can have the ability to extract more features for the same number of learnable parameters, thereby providing, for example, a more powerful parameterization.

Among the most desirable (e.g., potent) algebraic features of the disclosed tensor framework (e.g., t-product framework) are its matrix-mimetic properties. In particular, the disclosed subject matter (e.g., the network management component 220, the network component 202, and the network 204) can consider tensors to be, and can treat tensors as being, t-linear operators that can be analogous to matrices being linear operators. Tensors can act on lateral slices, and accordingly, lateral slices can be considered as analogous to vectors (hence, e.g., the notation $\vec{\mathcal{A}}$ in FIG. 4). For this reason, the network management component 220, the network component 202, and/or the network 204 can store data as lateral slices in the disclosed tensor framework. To complete the analogy, tubes can be the scalars of the tensor space (e.g., tubes can commute under the t-product).

In that regard, a tensor transpose can be defined wherein, given $\mathcal{A} \in \mathbb{R}^{\ell \times m \times n}$, $\mathcal{A}^T \in \mathbb{R}^{m \times \ell \times n}$ can be the transpose of each frontal slice with slices 2 through n reversed. The order of the last frontal slices can be reversed so that bcirc($\mathcal{A}^T$)=bcirc($\mathcal{A}$)$^T$. It will be convenient to think of the order reversal in the definition of the tensor transpose as the following frontal slice mapping presented in Eq. (5):

$$(l) \to (l) \text{ and } (k) \to (n-k+2) \text{ for } k=2, \ldots, n. \qquad \text{Eq. (5)}$$

With regard to identity and inverse features of tensors, the identity tensor $\mathcal{I} \in \mathbb{R}^{m \times m \times n}$ can be a tensor whose first frontal slice is the m×m identity matrix and the remaining slices are zero. For instance, consider a tensor $\mathcal{A} \in \mathbb{R}^{m \times m \times n}$. If $\mathcal{B} * \mathcal{A} = \mathcal{A} * \mathcal{B} = \mathcal{I}$, $\mathcal{B}$ can be the inverse of $\mathcal{A}$, which can be denoted as $\mathcal{A}^{-1}$. It is noted that bcirc($\mathcal{I}$) is an mn×mn identity matrix, as desired.

As presented herein, the disclosed subject matter, employing the network management component 220, can train the network 204 (e.g., deep tensor neural network). The network management component 220 can utilize forward propagation (e.g., tensor forward propagation), a loss function (e.g., tensor loss function), and back propagation (e.g., tensor back propagation) to facilitate training the network 204. In that regard, given $\mathcal{A}_j \in \mathbb{R}^{\ell_j \times m \times n}$, $\mathcal{W}_j \in \mathbb{R}^{\ell_{j+1} \times l_j \times n}$, and $\vec{\mathcal{B}} \in \mathbb{R}^{\ell_{j+1} \times 1 \times n}$, the tensor forward propagation can be defined, for example, as follows in Eq. (6):

$$\mathcal{A}_{j+1} = \sigma_j(\mathcal{W}_j * \mathcal{A}_j + \vec{\mathcal{B}}_j) \text{ for } j=0, \ldots, N-1, \qquad \text{Eq. (6)}$$

wherein $\sigma_j$ can be an element-wise, nonlinear activation function applied to the jth layer, and N can be the number of layers in the network. It is noted that $\mathcal{A}_{j+1} \in \mathbb{R}^{\ell_{j+1} \times m \times n}$. The summation operator "+" in Eq. (6) can add $\vec{\mathcal{B}}_j$ to each lateral slice of $\mathcal{W} * \mathcal{A}_j$.

With regard to the loss function (e.g., error (E) function or objective function), a classification matrix typically can be applied at the last layer of our network to reshape the output to the target matrix size. The disclosed subject matter can generalize this approach to tensors by applying a classification tensor $\mathcal{W} N \in \mathbb{R}^{p \times l_N \times n}$ to the final layer of the network 204, wherein p can be the number of classes. A goal of the disclosed subject matter (e.g., the network management component 220) can be to minimize or at least reduce (e.g., significantly or acceptably reduce) an objective function (e.g., loss function), such as the following example objective function E of Eq. (7):

$$E = V(\mathcal{J}(\mathcal{W}_N * \mathcal{A}_N), C), \qquad \text{Eq. (7)}$$

wherein V can be a convex loss function and $C \in \mathbb{R}^{p \times m}$ can be the target matrix whose columns are the target vectors. The function $f$ can be referred to as a tubal function because such function can be applied tube-wise (which can be a generalization of element-wise, for example) to a tensor. The notation $\mathcal{J}$ can indicate that a tubal function $f$ can be first applied (e.g., by the network management component 220), and a scalar-valued function can be applied thereafter (e.g., by the network management component 220) to convert each tube to a scalar (e.g., compute the sum of the elements of a tube). The function $\mathcal{J}$ can map tensors in $\mathbb{R}^{p \times m \times n}$ to matrices in $\mathbb{R}^{p \times m}$, the same size as the target matrix C.

To apply a tubal function, the action of tubes a, b∈ $\mathbb{R}^{1 \times 1 \times n}$ can be considered under the t-product, which can be equivalent to the action of a circulant matrix on a vector (e.g., see the definition of t-product, as disclosed herein). That is, $$a*b=\text{circ}(a)\cdot\text{vec}(b), \quad \text{Eq. (8)}$$

wherein circ(a) can be an n×n circulant matrix formed from elements of a, and vec(b) can be the n×1 vector of elements of b. Because of the matrix-representation in Eq. (8), applying a tubal function (e.g., by the network management component 220) can be equivalent to applying a matrix function to the circulant matrix.

Applying a matrix function can be equivalent to applying a scalar-valued function to the eigenvalues of the matrix. Because the (normalized) DFT matrix diagonalizes circulant matrices, applying a matrix function to a circulant matrix can be the same as, for example, the following, in Eq. (9):

$$f(\text{circ}(a))=F \cdot f(\text{diag}(\hat{a})) \cdot F^{-1} \quad \text{Eq. (9)}$$

wherein F can be the n×n DFT matrix and â can be the Fourier coefficients of a. Thus, applying a tubal function under the action of the t-product can be equivalent to applying scalar-valued function element-wise in the frequency domain and transforming back to the spatial domain.

The network management component 220 also can determine a tubal softmax function, in connection with the loss function. Given a vector $\vec{x} \in \mathbb{R}^{p \times 1}$, the vector softmax function $f: \mathbb{R}^{p \times 1} \to \mathbb{R}^{p \times 1}$ can be applied (e.g., by the network management component 220), for example, as follows in Eq. (10):

$$f(\vec{x})_i = \frac{e^{x_i}}{\sum_{j=1}^{p} e^{x_j}} \text{ for } i=1, \ldots, p. \quad \text{Eq. (10)}$$

The output of the tubal softmax function can be a p×1 vector whose elements are positive and sum to 1, which can be usefully interpreted as a vector of probabilities.

Now, suppose there is a lateral slice $\vec{X} \times \mathbb{R}^{p \times 1 \times n}$ which can be interpreted as a "vector of tubes," for example, as depicted below in Eq. (11):

$$\vec{X} = \begin{pmatrix} x_1 \\ x_2 \\ \vdots \\ x_p \end{pmatrix} = \begin{pmatrix} \mathscr{X} \\ \mathscr{X} \\ \vdots \\ \mathscr{X} \end{pmatrix}. \quad \text{Eq. (11)}$$

From this interpretation of the lateral slice as a "vector of tubes," the tubal softmax function $f: \mathbb{R}^{p \times 1 \times n} \to \mathbb{R}^{p/1 \times n}$ can be determined (e.g., determined or calculated by the network management component 220), for example, using Eq. (12):

$$f(\vec{X})_i = \left(\sum_{j=1}^{p} \exp(x_j)\right)^{-1} * \exp(x_i). \quad \text{Eq. (12)}$$

Based on Eq. (9), the network management component 220 can implement the tubal softmax function as parallel vector softmax functions (e.g., using Eq. (10)) in the frequency domain, and can transform the result of that determination (e.g., calculation) back to the spatial domain.

Once the tubal softmax function has been applied, the network management component 220 can obtain a new lateral slice $\vec{y}=f(\vec{X})$. It is noted that the sum of the tubes of $\vec{y}$ can be the identity tube $e_1$ (e.g., the first standard basis vector oriented along the third dimension); that is, $$\sum_{j=1}^{p} y_j = \sum_{j=1}^{p} \left[\left(\sum_{j=1}^{p} \exp(x_j)\right)^{-1} * \exp(x_i)\right] = \left(\sum_{j=1}^{p} \exp(x_j)\right)^{-1} * \left(\sum_{j=1}^{p} \exp(x_i)\right) = e_1. \quad \text{Eq. (13)}$$

Like the softmax function interpretation of a vector of probabilities, the tubal softmax function can give rise to an interpretation of tubal probabilities (e.g., tubes that sum to the identity tube).

To incorporate this tubal softmax function in the loss function (e.g., the example loss function of Eq. (7)), it can be desirable to transform the vector of tubes $\vec{y} \in \mathbb{R}^{p \times 1 \times n}$ into a vector $\vec{y} \in \mathbb{R}^{p \times 1}$. From Eq. (13), the sum of the entries in the first frontal slice of $\vec{y}$ can be equal to 1, and the sum of the remaining frontal slices can be equal to 0. Alternatively, if a sum were to be taken along the tubes of $\vec{y}$, that can return a vector of size p×1 whose entries can sum to 1. This vector can be interpreted as a vector of probabilities, which can mimic the traditional vector softmax function. In the network 204 (e.g., tensor neural network), the network management component 220 can implement, for example, the following function of Eq. (14):

$$\bar{f}(\vec{y})=\text{sum}(fy),3), \quad \text{Eq. (14)}$$

wherein $f$ can be the tubal softmax function and sum($\cdot$, 3) can sum along the tubes. This function $\vec{f}$ can output a vector of probabilities, which can be used in loss functions, such as, for example, cross-entropy.

With regard to tensor back-propagation, to facilitate tensor back-propagation and determination of updates to the network 204 (e.g., to facilitate training the network 204), the network management component 220 can perform the tensor back-propagation and determine the updates to the network 204 (e.g., updates to parameters, such as the weights and biases, of the network 204) using, for example, the tensor back-propagation formulas of Eq. (15), Eq. (16), Eq. (17), and Eq. (18):

$$\delta \mathcal{A}_N = W_N^T * \partial E / \partial \mathcal{A}_N, \quad \text{Eq. (15)}$$

$$\delta \mathcal{A}_j = \mathcal{W}_j^T * (\delta \mathcal{A}_{j+1} \odot \sigma_j'(\mathcal{Z}_{j+1})) \quad \text{Eq. (16)}$$

$$\delta \mathcal{W}_j = (\delta \mathcal{A}_{j+1} \odot \sigma_j'(\mathcal{Z}_{j+1})) * \mathcal{A}_j^T, \quad \text{and Eq. (17)}$$

$$\delta \vec{\mathcal{B}}_j = \text{sum}(\delta \mathcal{A}_{j+1} \odot \sigma_j'(\mathcal{Z}_{j+1}),2), \quad \text{Eq. (18)}$$

wherein $\delta \mathcal{A}_j := \partial E / \partial \mathcal{A}_j$ is the error on the $j^{th}$ layer, $\mathcal{Z}_{j+1} = \mathcal{B}_j * \mathcal{A}_j + \mathcal{A}_j$, $\sigma_j'$ is the derivative of the activation function, $\odot$ can be the Hadamard element-wise product, and sum($\cdot$, 2) can be the sum along the second dimension (e.g., the sum of the lateral slices). The update for the weight parameter can be, or can be based at least in part on, $\delta \mathcal{W}_j$. The update for the bias parameter can be, or can be based at least in part on, $\delta \vec{\mathcal{B}}_j$. We derive these formulas (Eq. (15), Eq. (16), Eq. (17), and Eq. (18)) below:

These tensor back-propagation formulas can be derived as follows. The derivation can rely in part on formulas for matrix back-propagation. With regard to Eq. (15), the tensor loss back-propagation formula can be derived for a single training sample stored as a lateral slice. The formula can naturally generalize to multiple training samples. Let $\vec{\mathcal{A}}_N \in \mathbb{R}^{l_N \times 1 \times n}$ be the network output of a single training sample, and suppose the tensor softmax function is applied as described in Eq. (12) and Eq. (14) to obtain a vector of probabilities $\vec{y} = \vec{f}(\mathcal{W}_N * \vec{\mathcal{A}}_N)$. The performance of the network (e.g., network 204) can be evaluated on $\vec{\mathcal{A}}_N$ in an objective function $E = V(\vec{y}, \vec{c})^2$. To improve performance of the network via back-propagation, the error in the performance due to the output (e.g., output data) from the network can be computed, which can be denoted as follows:

$$\frac{\partial E}{\partial \vec{\mathcal{A}}_N} = \frac{\partial V}{\partial \vec{y}} \cdot \frac{\partial \vec{y}}{\partial \vec{\mathcal{A}}_N} = \frac{\partial V}{\partial \vec{y}} \cdot \frac{\partial \vec{f}(W_N * \vec{\mathcal{A}}_N)}{\partial \vec{\mathcal{A}}_N}. \qquad \text{Eq. (19)}$$

To make the notation less complex, let $\vec{x} = \mathcal{W}_N * \vec{\mathcal{A}}_N$. Expressing $\vec{f}(\vec{X}) = (\text{sum}(\vec{y}, 3))$, the expanded multivariable chain rule is the following:

$$\frac{\partial V}{\partial \vec{y}} \cdot \frac{\partial \text{sum}(\vec{y}, 3)}{\partial \vec{\mathcal{A}}_N} = \frac{\partial V}{\partial \vec{y}} \cdot \frac{\partial \text{sum}(\vec{y}, 3)}{\partial \vec{y}} \cdot \frac{\partial \vec{y}}{\partial \vec{x}} \cdot \frac{\partial \vec{x}}{\partial \vec{\mathcal{A}}_N}. \qquad \text{Eq. (20)}$$

A significant differentiation operation can be $\partial \vec{y}/\partial \vec{x}$, wherein the tubal softmax function $f$ can be differentiated. Because tubal functions can be applied tube-wise, for example, in Eq. (12), tube-wise can be differentiated using, e.g., Eq. (21):

$$\frac{\partial y_i}{\partial x_j} = \frac{\partial}{\partial x_j}\left[\left(\sum_{j=1}^{p} \exp(x_j)\right)^{-1} * \exp(x_i)\right]. \qquad \text{Eq. (21)}$$

To derive Eq. (16), Eq. (6) can be rewritten in matrix form (see, e.g., the definition of the t-product, as disclosed herein) and can use the following matrix back-propagation formula:

$$\text{unfold}(\delta \mathcal{A}_j) = \text{bcirc}(\mathcal{W}_j)^T \cdot (\text{unfold}(\delta \mathcal{A}_{j+1}) \odot \sigma'(\text{unfold}(\vec{\mathcal{Z}}_{j+1}))). \qquad \text{Eq. (22)}$$

As described herein with regard to the tensor transpose, $\text{bcirc}(\mathcal{W}_j)^T = \text{bcirc}(\mathcal{W}_j^T)$, and thus, Eq. (22) can be rewritten in terms of tensors as shown in Eq. (16). The proof of Eq. (18) is relatively similar and the sum along the second dimension can come from the chain rule.

To derive Eq. (17), the forward propagation formula of Eq. (6) can be written for a particular frontal slice as defined in Eq. (3), for example, as follows in Eq. (23):

$$A_{j+1}^{(k)} = \qquad \text{Eq. (23)}$$

$$\sigma_j\left(W_j^{(k)} \cdot A_j^{(1)} + \sum_{i=1}^{k-1} W_j^{(i)} \cdot A_j^{(k-i+1)} + \sum_{i=k+1}^{n} W_j^{(i)} \cdot A_j^{(n-i+k+1)} + B_j^{(i)}\right).$$

Because frontal slices are matrices, Eq. (20) can be differentiated with respect to $W_j^{(i)}$, and $\delta W_j^{(i)}$ can be computed as follows. Let $\delta \mathcal{A}_{j+1} \odot \sigma_{j+1}'(\vec{\mathcal{Z}}_{j+1})$, $\delta W_j^{(i)}$ can be determined, for example, using Eq. (21):

$$\delta W_j^{(i)} = \sum_{k=1}^{n} \frac{\partial E}{\partial A_{j+1}^{(k)}} \cdot \frac{\partial A_{j+1}^{(k)}}{\partial W_j^{(i)}} \qquad \text{Eq. (24)}$$

$$= \delta \tilde{A}_{j+1}^{(i)} \cdot (A_j^{(1)})^T + \sum_{k=1}^{i-1} \delta \tilde{A}_{j+1}^{(k)} \cdot$$

$$(A_j^{(n-i+k+1)})^T + \sum_{k=i+1}^{n} \delta \tilde{A}_{j+1}^{(k)} \cdot (A_j^{(n-i+k+1)})^T.$$

It can be observed that Eq. (24) is similar to Eq. (3) except for the index of the frontal slices: the first sum contains $A^{(n-i+k+1)}$ instead of $A^{(i-k+1)}$ and the second sum contains $A^{(k-i+1)}$ instead of $A^{(n-k+i+1)}$. This is exactly the frontal slice mapping of the tensor transpose from Eq. (5) and therefore it can be concluded:

$$\delta W_j = (\delta \mathcal{A}_{j+1} \odot \sigma_j'(\vec{\mathcal{Z}}_{j+1})) * \mathcal{A}_j^T. \qquad \text{Eq. (25)}$$

To complete the back-propagation derivation, the loss function can be differentiated to form $\delta E/\delta \mathcal{A}_N$ in Eq. (16).

The fact that Eq. (16), Eq. (17), and Eq. (18) are analogous to their matrix counterparts is no coincidence. In the disclosed t-product framework, tensors can be t-linear operators just as matrices can be linear operators. This can result in a desirable high-dimensional extension of matrix-based theory, and hence, can result in the desirable mimetic features of the tensor back-propagation formulas.

It can be desirable for neural networks to be stable. As the depth of a network (e.g., network 204) increases (e.g., more layers), gradient-based approaches can be subject to numerical instability known as the vanishing or exploding gradient problem. To combat this problem, deep neural networks can be interpreted as discretizations of differential equations. From this perspective, the stability of forward propagation can be analyzed as well as the well-posedness of the learning problem; e.g., does the classifying function depend continuously on the initialization of the weights and biases. By ensuring stability and well-posedness, networks can generalize better to similar data and can classify data more robustly.

In accordance with various aspects and embodiments, the disclosed subject matter (e.g., employing the network management component 220 and network 204) can create a stable tensor network architecture for the network 204. In that regard, consider the following example tensor forward propagation scheme of Eq. (23):

$$\mathcal{A}_{j+1} = \mathcal{A}_j + h \cdot \sigma_j(\mathcal{W}_j * \mathcal{A}_j + \vec{\mathcal{B}}_j) \text{ for } j=0, \ldots, N-1 \qquad \text{Eq. (26)}$$

This formula is akin to a residual network with a relatively minor modification of a step size parameter h. Let $\sigma_j = \sigma$ be a fixed activation function. In such case, the disclosed subject matter can consider Eq. (26) to be the explicit Euler discretization of the following system of continuous differential equations:

$$\frac{d\mathcal{A}}{dt} = \sigma\Big(\mathcal{W}(t) * \mathcal{A}(t) + \vec{\mathcal{B}}(t)\Big) \text{ with } \mathcal{A}(0) = \mathcal{A}_0. \qquad \text{Eq. (27)}$$

over the time interval [0, T], The final time T can be interpreted as the depth of the neural network (e.g., network 204) in the discrete case. From the definition of the t-product disclosed herein, Eq. (27) can be rewritten in terms of matrices, for example, as illustrated in Eq. (28):

$$\text{unfold}\left(\frac{d\mathcal{A}}{dt}\right) = \sigma(bcirc(\mathcal{W}(t)) \cdot \text{unfold}(\mathcal{A}(t))). \quad \text{Eq. (28)}$$

The stability of ordinary differential equations can depend on the eigenvalues of the Jacobian J(t) of the system with respect to A. Additionally, because Eq. (27) is a non-autonomous system of ordinary differential equations (ODEs), it can be desirable for J(t) to change gradually in time. This Jacobian can depend on both bcirc($\mathcal{W}$(t)) and σ'. Because σ typically can be monotonic, the stability of Eq. (27) can depend on the eigenvalues of bcirc($\mathcal{W}$(t)) for all t∈ [0, T]. The following related conditions of Eq. (29) can be desirable to ensure a well-posed learning problem:

$$\underbrace{\text{Re}(\lambda_i(bcirc(\mathcal{W}(t)))) \leq 0}_{\text{stable forward prop.}} \text{ and } \underbrace{\text{Re}(\lambda_i(bcirc(\mathcal{W}(t)))) \approx 0,}_{\text{stable back prop.}} \quad \text{Eq. (29)}$$

for i=1, . . . , n² and for all t∈ [0,T].

Because it typically can be impractical to adjust eigenvalues during the learning process, the disclosed subject matter (e.g., network management component 220 and network 204) can employ a forward propagation scheme that can ensure well-posedness. In that regard, the network management component 220 and network 204 can employ inherently stable tensor forward propagation techniques, such as described herein. In some embodiments, the network management component 220 can employ a Hamiltonian-inspired, stable forward propagation technique for tensors. A Hamiltonian can be a system H($\vec{a}$, $\vec{z}$, t) which can satisfy Eq. (30):

$$\frac{d\vec{a}}{dt} = \nabla_{\vec{z}} H(\vec{a}, \vec{z}, t) \text{ and } \frac{d\vec{z}}{dt} = -\nabla_{\vec{a}} H(\vec{a}, \vec{z}, t), \forall t \in [0, T]. \quad \text{Eq. (30)}$$

Motivated by physical phenomena, $\vec{a}$ can be interpreted as position and $\vec{z}$ can be interpreted as momentum or velocity. Such systems are designed to solve second-order differential equations. Hamiltonians have several nice properties including, for example, time reversibility, energy conservation, and symplecticness. For neural networks (e.g., network 204), the latter two properties can preserve the topology of the data and can ensure a well-posed learning problem can be solved.

Consider the following symmetrized tensor Hamiltonian system, written in matrix-form using the disclosed definition of the t-product:

$$\frac{d}{dt}\begin{bmatrix} unf(\mathcal{A}) \\ unf(\mathcal{Z}) \end{bmatrix} = \quad \text{Eq. (31)}$$

$$\sigma\left(\begin{bmatrix} 0 & bcirc(\mathcal{W}(t)) \\ -bcirc(\mathcal{W}(t))^T & 0 \end{bmatrix} \cdot \begin{bmatrix} unf(\mathcal{A}(t)) \\ unf(\mathcal{Z}(t)) \end{bmatrix} + unf(\vec{\mathcal{B}}(t))\right),$$

wherein $\mathcal{A}$ (0)=$\mathcal{A}_0$ and $\mathcal{Z}$ (0)=0. This system can be inherently stable, e.g., independent of the choice of weight tensors $\mathcal{W}$ (t), because of the block-antisymmetric structure of the forward propagation matrix. Antisymmetric matrices can have imaginary eigenvalues, and hence, Eq. (31) can be a system that can satisfy Eq. (29).

Eq. (31) can be discretized using a leapfrog integration scheme, which can be a symplectic integrator, and using the t-product as follows in Eq. (32):

$$\begin{cases} \mathcal{Z}_{j+\frac{1}{2}} = \mathcal{Z}_{j-\frac{1}{2}} - h \cdot \sigma\left(\mathcal{W}_j^T * \mathcal{A}_j + \vec{\mathcal{B}}_j\right) \\ \mathcal{A}_{j+1} = \mathcal{A}_j + h \cdot \sigma\left(\mathcal{W}_j * \mathcal{Z}_{j+\frac{1}{2}} + \vec{\mathcal{B}}_j\right) \end{cases} \text{ for } j=0, \ldots, N-1. \quad \text{Eq. (32)}$$

Because Eq. (31) can be inherently stable, the discretized analog of Eq. (32) can be stable if the step size h is sufficiently small enough and if the weights $\mathcal{W}_j$ change gradually over the layers.

The benefits of an inherently stable network can be illustrated with the following example regarding tensor leapfrog stability. Given a data set initialized with a mean of 0 and a standard deviation of 3, the network is trained with 1200 data points (e.g., 317 points being inside a sphere of radius 3.5, 466 points inside of a sphere of radius 5.5, and 417 points that are outside of both spheres), and the data is stored as 1×1×3 tubes.

The data is forward propagated with one of the following discretizations Eq. (30) for N=32. The weights $w_j$ are 1×1×3 tubes generated randomly from a standard-normal distribution and normalized, and the biases $b_j$ are 1×1×3 tubes initialized at 0.

Forward Euler (*FE*)         Eq. (33)
$$a_{j+1} = a_j + h \cdot \sigma(w_j * a_j + b_j)$$

Leapfrog
$$\begin{cases} z_{j+\frac{1}{2}} = z_{j-\frac{1}{2}} - h \cdot \sigma\left(w_j^T * y_j + b_j\right) \\ y_{j+1} = y_j + h \cdot \sigma\left(w_j * z_{j+\frac{1}{2}} + b_j\right) \end{cases}$$

The network is trained for 50 epochs using batch gradient descent with a batch size of 10 and a learning parameter of α=0.01. The tensor leapfrog example sets h=1. One of the FE examples has h=0.5, and the other FE example has h=0.25. To create smoother dynamics, the weights are regularized in accordance with Eq. (34).

$$r(w) = \frac{1}{2h}\sum \|w_j - w_{j-1}\|_F^2 \text{ for } j=0, \ldots, N-1. \quad \text{Eq. (34)}$$

The results of such example training illustrate the dynamics of the various neural network (e.g., tNN) discretizations. The results show that there are qualitative benefits for the tensor leapfrog. In particular, for the tensor leapfrog training results, the output is linearly-separable by label of the different types of data points while topologically similar to the original data. Linear-separability can be desirable for accurate classification. In contrast, the results of the training for the FE examples show that neither FE example produces a classifiable output. Furthermore, the topology of the data changes in the FE cases, such as compressing of the data points with regard to the FE example having h=0.25, and the breaking apart of data points with regard to the FE example having h=0.5. Such topological changes can yield ill-posed learning problems and relatively poor network generalization.

As disclosed herein, while the t-product is one type of tensor-tensor product that can be used to implement a tensor neural network (e.g., network 204), the disclosed subject matter (e.g., network management component 220 and network 204) can implement any type of tensor-tensor product in a tensor neural network (e.g., network 204) within the same or similar tNN framework, such as described herein. For example, one type of tensor-tensor product that the disclosed subject matter (e.g., network management component 220 and network 204) can implement in network 204 is the M-product. The M-product can be a tensor-tensor product based at least in part on any invertible linear transformation, and each transformation can induce different algebraic properties on the space. By forming a tNN framework under a different tensor-tensor product, such as an M-product, underlying correlations can be revealed in the data more efficiently.

With regard to the M-product, a mode-3 product can be defined as follows. Given $\mathcal{A} \in \mathbb{R}^{\ell \times m \times n}$ and a matrix $M \in \mathbb{R}^{n \times n}$, the mode-3 product, which can be denoted $\mathcal{A} \times_3 M$, can be defined, for example in accordance with Eq. (35):

$$\mathcal{A} \times_3 M = \text{fold}_3[M \cdot \text{unfold}_3[\mathcal{A}]], \quad \text{Eq. (35)}$$

wherein $\text{unfold}_3[\mathcal{A}] \in \mathbb{R}^{n \times \ell m}$ can be a matrix whose columns are the tube fibers of $\mathcal{A}$ and $\text{fold}_3[\text{unfold}_3[\mathcal{A}]] = \mathcal{A}$. The mode-3 product can be connected to the unfold operator, for example, using Eq. (36) as follows:

$$\mathcal{A} \times_3 M = \text{fold}((M \otimes I) \cdot \text{unfold}(\mathcal{A})), \quad \text{Eq (36)}$$

wherein $\otimes$ can denote the Kronecker product and I can be the $\ell \times \ell$ identity matrix.

With respect to the M-product, the facewise product can be defined as follows. Given $\mathcal{A} \in \mathbb{R}^{\ell \times p \times n}$ and $\mathcal{B} \in \mathbb{R}^{\ell \times n \times n}$, the facewise product, which can be denoted $\mathcal{C} = \mathcal{A} \triangle \mathcal{B}$, can be defined, for example, using Eq. (37):

$$\mathcal{C} = \mathcal{A} \triangle \mathcal{B} = \text{fold}(bdiag(\mathcal{A}) \cdot \text{unfold}(\mathcal{B})) = \text{fold}\left(\begin{pmatrix} A^{(1)} & & & \\ & A^{(2)} & & \\ & & \ddots & \\ & & & A^{(n)} \end{pmatrix} \begin{pmatrix} B^{(1)} \\ B^{(2)} \\ \vdots \\ B^{(n)} \end{pmatrix}\right). \quad \text{Eq. (37)}$$

wherein $\mathcal{C} \in \mathbb{R}^{\ell \times m \times n}$. To state the facewise product another way, the facewise product can multiply the frontal slices of $\mathcal{A}$ and $\mathcal{B}$ independently.

With the definition of the mode-3 product and the facewise product, the M-product can be defined as follows. Given $\mathcal{A} \in \mathbb{R}^{\ell \times p \times n}$ and $\mathcal{B} \in \mathbb{R}^{\ell \times p \times m \times n}$ and an invertible matrix $M \in \mathbb{R}^{n \times n}$, the M-product can be defined, for example, using Eq. (38) as:

$$\mathcal{C} = \mathcal{A} *_M \mathcal{B} = ((\mathcal{A} \times_3 M) \triangle (\mathcal{B} \times_3 M)) \times_3 M^{-1}, \quad \text{Eq. (38)}$$

wherein $\mathcal{C} \in \mathbb{R}^{\ell \times m \times n}$. If M is the identity matrix, the M-product can be equivalent to the facewise product.

With the M-product being defined, the M-product transpose can be defined as follows. Given $\mathcal{A} \in \mathbb{R}^{\ell \times m \times n}$, the M-product transpose. $\mathcal{A}^T \in \mathbb{R}^{m \times \ell \times n}$ can be the transpose of each frontal slice of the tensor if $M \in \mathbb{R}^{n \times n}$. It is noted that it can be desirable for the M-product transpose to preserve $(\mathcal{A} \times_3 M)^T = (\mathcal{A}^T \times_3 M)$.

Similar to performing back-propagation using the t-product, such as described herein, the disclosed subject matter (e.g., the network management component 220 and network 204) can utilize the M-product to perform back-propagation to determine updates to parameters, such as weights and biases, for the network 204 to facilitate training, managing, and improving the performance of the network 204. With regard to M-Product back-propagation, the disclosed subject matter can employ, for example, the following forward propagation scheme of Eq. (39):

$$\mathcal{A}_{j+1} = \sigma_j(\underbrace{W_{j*M}\mathcal{A}_j + \vec{\mathcal{B}}_j}_{Z_{j+1}}) \text{ for } j = 0, \ldots, N-1. \quad \text{Eq. (39)}$$

The disclosed subject matter (e.g., the network management component 220) can evaluate performance of the network 204 using a tensor loss function (e.g., error (E) function or objective function), such as, for example, $E = V(W_{N*M} \mathcal{A}_N, C)$. If the M-product uses an orthogonal matrix M, the back-propagation formulas employed by the network management component 220 and the network 204 can include, for example, Eq. (40), Eq. (41), and Eq. (42) as follows:

$$\delta \mathcal{A}_j \le W^{T*}_M (\delta \mathcal{A}_{j+1} \odot \sigma_j'(\mathcal{Z}_{j+1})), \quad \text{Eq. (40)}$$

$$\delta W_j = (\delta \mathcal{A}_{j+1} \odot \sigma_j'(\mathcal{Z}_{j+1})) * A_j^T, \quad \text{Eq. (41)}$$

and $$\delta \vec{\mathcal{B}}_j = \text{sum}(\delta \mathcal{A}_{j+1} \odot \sigma_j'(\mathcal{Z}_{j+1}), 2). \quad \text{Eq. (42)}$$

The update for the weight parameter can be, or can be based at least in part on, $\delta W_j$. The update for the bias parameter can be, or can be based at least in part on, $\delta \vec{\mathcal{B}}_j$.

The M-product back-propagation can be derived as described herein. It can be useful to note the following back-propagation formula for the mode-3 product. A scalar function $f(\mathcal{A} \times_3 M)$ can be differentiated with respect to $\mathcal{A}$ using Eq. (43):

$$\frac{\partial}{\partial \mathcal{A}} [f(\mathcal{A} \times_3 M)] = \frac{\partial}{\partial \mathcal{A}} [f(\text{fold}((M \otimes I) \cdot \text{unfold}(\mathcal{A})))] \quad \text{Eq. (43)}$$
$$= \text{fold}((M \otimes I)^T \cdot \text{unfold}(f'(\mathcal{A} \times_3 M)))$$
$$= f'(\mathcal{A} \times_3 M) \times_3 M^T.$$

For the facewise product, the derivatives can be derived from the representation of the facewise product in Eq. (37). The foregoing can be utilized to facilitate differentiating the M-product and deriving the back-propagation formula. A scalar function $f(W *_M \mathcal{A})$ can be differentiated, for example, using Eq. (44):

$$\frac{\partial}{\partial \mathcal{A}} [f(W *_M \mathcal{A})] = \frac{\partial}{\partial \mathcal{A}} [f(((W \times_3 M) \triangle (\mathcal{A} \times_3 M)) \times_3 M^{-1})] \quad \text{Eq. (44)}$$
$$= ((W^T \times_3 M) \triangle (f'(W *_M \mathcal{A}) \times_3 M^{-T})) \times_3 M^T.$$

While Eq. (44) is not a very compact formula, if M is restricted to be orthogonal (e.g., $M^{-1} = M^T$), the following desirable matrix-mimetic formula of Eq. (45) can be obtained:

$$\frac{\partial}{\partial \mathcal{A}}[f(\mathcal{W}_{*M}\mathcal{A})] = \mathcal{W}_{*M}^T f'(\mathcal{W}_{*M}\mathcal{A}).  \quad \text{Eq. (45)}$$

If the scalar function $f$ is the loss function E, obtained is exactly the formula that is expected for the error $\delta \mathcal{A}_j$ in Eq. (40). A similar derivation can be used to verify the formula for the weight and bias update in Eq. (41) and Eq. (42).

Experimental results demonstrate that the tNN of the disclosed subject matter performs quite favorably and more efficiently as compared to a matrix equivalent for both the Modified National Institute of Standards and Technology (MNIST) dataset and the Canadian Institute for Advanced Research (CIFAR)-10 dataset. A tNN with leapfrog integration was compared to a matrix equivalent for the MNIST dataset and the CIFAR-10 dataset, wherein both the tensor and leapfrog frameworks were implemented using Pytorch.

With regard to the MNIST results, it was observed that both the tensor leapfrog network and the matrix leapfrog network converged to a relatively high accuracy of approximately 97% to 98%, even though the tensor leapfrog network had an order of magnitude fewer weight parameters than the matrix leapfrog network. The efficiency and benefits of using tensors for the network over a matrix equivalent is very apparent when comparing the tensor network with four leapfrog layers to a matrix network having 8 leapfrog layers. In such case, the tensor network performs nearly as well as the matrix network, despite the tensor network having significantly fewer learnable parameters than the matrix network.

The convergence behavior of the loss functions for the tensor network and matrix network is even more significant than the convergence of the accuracy. Using a tensor loss function, a more rapid and greater decrease of the loss evaluation was obtained than in the case of the matrix network cases using a traditional cross-entropy loss function. The rapid descent of the loss, particularly in the eight-layer tNN, demonstrates the efficiency of fitting the model using the disclosed tensor framework. The model using the disclosed tensor framework is able to be fit quickly while maintaining desirably high accuracy, and greater improvement in the model using the disclosed tensor framework as the parameters associated with the network are updated. In the matrix networks, the loss quickly stagnates, and this enables the tNNs to overtake the accuracy of the matrix networks.

With regard to the results for the CIFAR-10 dataset, the observed convergence behavior is rather striking. Despite the tNNs having significantly fewer learnable parameters than the matrix equivalent networks, the tNNs exhibited superior accuracy and loss results as compared to their matrix network counterparts. Because of the more powerful tNN parameterization, the tNNs can converge to their top accuracy more rapidly and the loss for the tNNs converges more quickly to a desirably lower value, as compared to the matrix network counterparts, which can thereby indicate that the tNN model is extracting more significant features from the original data than the matrix network counterparts.

The efficiency of the disclosed tensor-based networks over matrix network counterparts is further demonstrated by results showing that, even though the tNNs had a significantly shallower network than the matrix equivalent networks, tNNs with eight leapfrog layers produced comparable results to matrix equivalent networks with sixty-four leapfrog layers. This is evidence that tensor-tensor products not only enable desirably rapid convergence due to the reduced number of parameters, but also have the ability to encode meaningful features, e.g., a more powerful parameterization.

Figure 7:
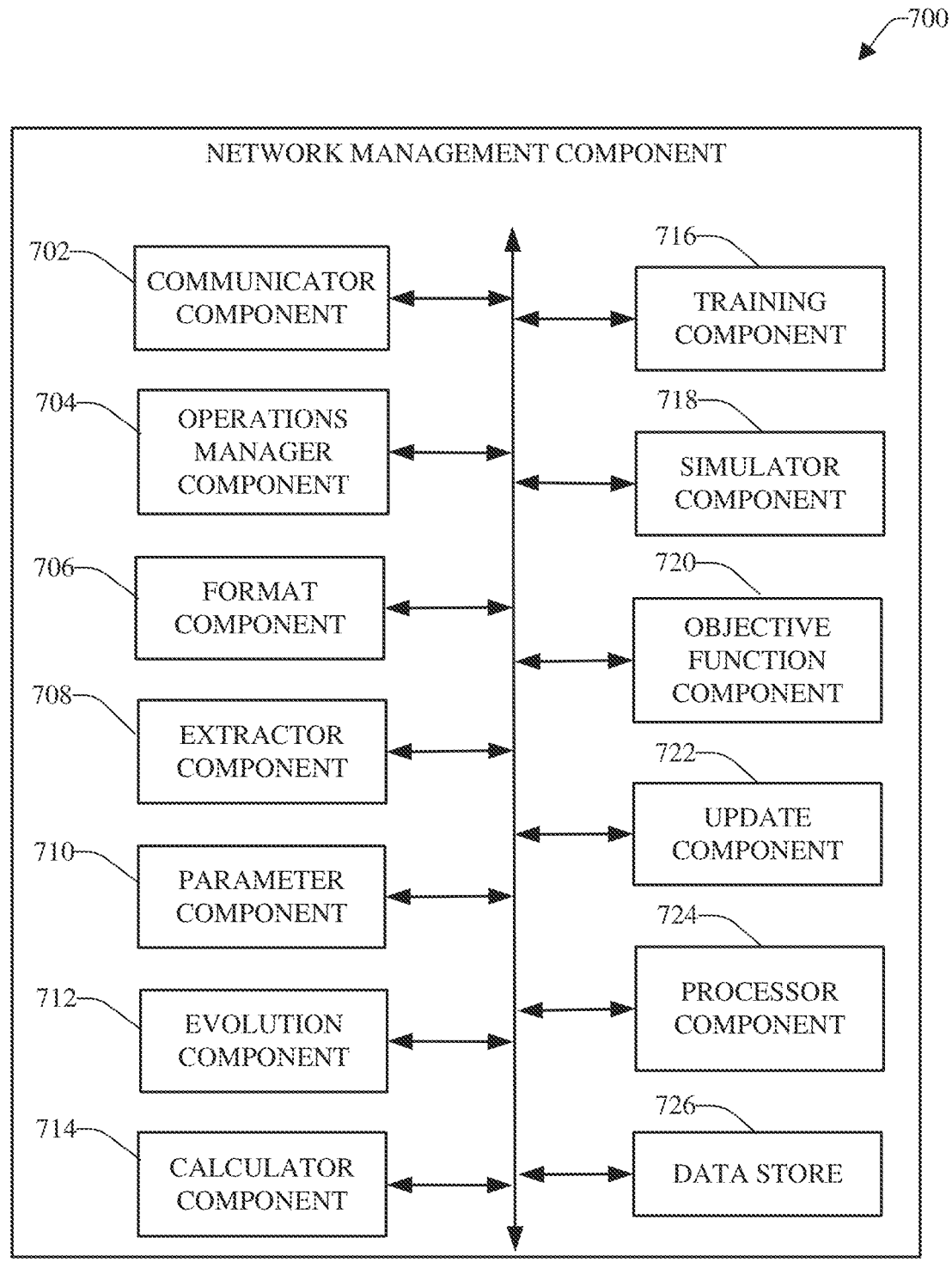
FIG. 7 illustrates a block diagram of an example network management component in accordance with various embodiments described herein.

FIG. 7 illustrates a block diagram of an example network management component 700 in accordance with various embodiments described herein. The network management component 700 can comprise a communicator component 702, an operations manager component 704, a format component 706, an extractor component 708, a parameter component 710, an evolution component 712, a calculator component 714, a training component 716, a simulator component 718, an objective function component 720, an update component 722, a processor component 724, and a data store 726.

The communicator component 702 can be employed to transmit information from the network management component 700 to another component or device (e.g., a network, a node, a network component, a database component, an interface or display screen, a computer, . . . ) associated with (e.g., communicatively connected to) the network management component 700 and/or receive information from another component or device (e.g., the network, a node, the network component, the database component, a touchscreen, a keyboard or keypad, a mouse, a trackpad, an audio interface, and/or another interface). For example, the communicator component 702 can communicate parameter-related information and/or update-related information (e.g., information relating to an update of parameters) to the network to facilitate setting or updating the parameters (e.g., weights, biases, . . . ) of the network. As another example, the communicator component 702 can receive information, via a desired interface, from a user and/or the database component. For instance, the communicator component 702 can receive information regarding network structure, parameters, constants, activation functions, and/or other user-defined information from the user. The communicator component 702 also can receive information relating to network structure, parameters, constants, activation functions, input data, simulation data, and/or other data from the database component.

The operations manager component 704 can control (e.g., manage) operations associated with the network management component 700. For example, the operations manager component 704 can facilitate generating instructions to have components of the network management component 700 perform operations, and can communicate instructions to components (e.g., communicator component 702, format component 706, extractor component 708, parameter component 710, evolution component 712, calculator component 714, training component 716, simulator component 718, objective function component 720, update component 722, processor component 724, and/or data store 726, . . . ) of the network management component 700 to facilitate performance of operations by the components of the network management component 700 based at least in part on the instructions in accordance with the defined network management criteria and network management algorithm(s). The operations manager component 704 also can facilitate controlling data flow between the components of the network management component 700 and controlling data flow between the network management component 700 and another component(s) or device(s) (e.g., the network, a node, the network component, the database component, a display screen or other interface, a computer, . . . ) associated with (e.g., connected to) the network management component 700.

The format component 706 can format data (e.g., input data being applied or input to the network) and parameters, based at least in part on a defined tensor format, to generate tensor-formatted data and tensor-formatted parameters. The defined tensor format can be determined based at least in part on the type of tensors being employed by the network management component 700 and the network. For example, the format component 706 can utilize a first type of tensor format when the t-product is being utilized for the network, a second type of tensor format when the M-product is being utilized for the network, or another type of tensor format when another type of tensor products being utilized for the network.

The extractor component 708 can extract features from the input data (e.g., data input or applied to the network) based at least in part on the items of data of the input data and the parameters of the network. The parameters can comprise or relate to the weights applied to or associated with the edges associated with the nodes of the network, biases applied to or associated with the network, constants or coefficients associated with activation functions, and/or other constants, coefficients, or parameter values of or associated with the parameters. The features extracted by the extractor component 708 can comprise or relate to, for example, image features, facial features, objects, object features (e.g., shape, size, texture, . . . , of objects), correlations between items of data, and/or other types of features.

The parameter component 710 can comprise information regarding the various types of parameters of or associated with the network, and can facilitate setting or updating the various parameters of or associated with the network. For instance, the parameter component 710 can set (e.g., initially set) parameters (e.g., weights associated with edges, biases, . . . ) of the network based at least in part on user-defined parameters received from a user or parameters obtained from the database component. The parameter component 710 also can coordinate with or operate in conjunction with the update component 722 to update parameters (e.g., update weights associated with edges, update biases, . . . ) of the network, based at least in part on updates determined by the update component 722.

The evolution component 712 can evolve data (e.g., input data) and/or parameters of, in, or through the network based at least in part on a defined tensor-tensor layer evolution rule. The evolving of the data and/or parameters associated with the network can facilitate or be associated with the updating of the parameters of the network. For instance, the evolving of the parameters of the network can be based at least in part on back-propagation of information relating to the objective function (e.g., the error function) and the updates to the parameters derived in part therefrom in accordance with the defined tensor-tensor layer evolution rule.

The calculator component 714 can perform calculations on data (e.g., data points or values) and transformations of data. The calculator component 714 can perform mathematical operations on data, wherein the mathematical operations can include, for example, addition, subtraction, multiplication, division, derivative operations, integration, differential equation operations, and/or other desired mathematical operations. The calculator component 714 can perform such mathematical operations in accordance with the defined tensor format being utilized by the network management component 700 and the network. The calculator component 714, for example, can perform calculations using one or more of the various equations disclosed or described herein to generate calculation results that can be utilized to facilitate managing the network, updating parameters associated with the network, etc. For instance, the calculator component 714 can calculate the objective function, with respect to output data (e.g., data output from the network based on input data to the network), and/or calculate updates to parameters associated with the network, using respectively applicable equations, such as the equations disclosed herein. The calculator component 714 also can transform data using FFTs or IFFTs, and/or can transform data from one domain (e.g., frequency domain) to another domain (e.g., spatial domain).

The training component 716 can utilize training data to facilitate training (e.g., iteratively training) the network. The training component 716 (e.g., via the communicator component 702) can retrieve the training data from the database component or from another data source. The training component 716 can apply the training data (e.g., as tensor formatted by the format component 706) to the network to facilitate training the network. For instance, the training component 716 can apply the tensor-formatted training data to the input nodes of the network. The network can forward propagate the tensor-formatted training data through the network, wherein the network can process the tensor-formatted training data through the various nodes of the various layers (e.g., input layer, intermediate layer(s), output layer) of the network. The network can generate output training data as an output from the network (e.g., from the output nodes) based at least in part on the processing of the tensor-formatted training data by the network.

The simulator component 718 can facilitate providing simulated output data relating to the network, wherein the simulated output data can be utilized to facilitate training the network. In some embodiments, the simulator component 718 can simulate outcomes (e.g., expected or predicted outcomes) of the network, wherein the simulated outcomes can comprise or be associated with the network. In other embodiments, the simulator component 718 can obtain the simulated output data relating to the network from a desired data source (e.g., the database component). The training component 716 and/or the objective function component 720 can compare the simulated output data to the actual output data (e.g., output training data), based at least in part on the defined objective function, to facilitate determining an amount of error associated with the network (e.g., an amount of error in the actual output data being produced as an output from the network) and/or a difference between the simulated output data and the actual output data.

The objective function component 720 can employ the defined objective function (e.g., loss function or error function) to facilitate determining the amount of error associated with the output data that is produced as an output from the network. The objective function component 720 can coordinate with or work in conjunction with the calculator component 714 and/or training component 716 to determine or calculate an objective function result or value, which can be, can correspond to, or can relate to the amount of error associated with the output data.

The update component 722 can determine and perform updates to parameters associated with the network based at least in part on back-propagated information associated with the network. The back-propagated information can comprise, relate to, or can be based at least in part on the objective function (e.g., an objective function result or value determined based on output data produced as an output from the network), the parameters, the output data, and/or the input data applied to the network. For example, the update component 722 can determine updates to the weight parameter and the bias parameter associated with the network based at least in part on the objective function (e.g., objective function result or value indicating the amount of error) with respect to output data (e.g., output training data) produced from the network and/or simulated output data (e.g., simulated output training data). The update component 722 can perform the update to the network to update the parameters (e.g., weight parameter, bias parameter, . . . ) based at least in part on the determined update.

The processor component 724 can be associated with the data store 726, and the other components of the network management component 700. The processor component 724 can work in conjunction with the other components (e.g., communicator component 702, operations manager component 704, format component 706, extractor component 708, parameter component 710, evolution component 712, calculator component 714, training component 716, simulator component 718, objective function component 720, update component 722, and/or data store 726, . . . ) to facilitate performing the various functions of the network management component 700. The processor component 724 can employ one or more processors, microprocessors, or controllers that can process data, such as information relating to tensors, a network, nodes, edges, network structure, input data, output data, parameters, formulas or equations, calculations, network training, objective functions, simulated output data, updates to parameters, tensor-tensor layer evolution rules, defined network management criteria, algorithms (e.g., network management algorithms, network training algorithms, . . . ), data traffic flows (e.g., between components or devices, and/or across a network(s)), protocols, policies, interfaces, tools, and/or other information, to facilitate operation of the network management component 700, as more fully disclosed herein, and control data flow between components of the network management component 700, control data flow between the network management component 700 and other components or devices (e.g., the network, the network component, the database component, interfaces, applications, computers, . . . ) associated with the network management component 700. In accordance with various embodiments, the processor component 724 can comprise one or more processor components, floating-point units (FPUs)), graphics processing units (GPUs), accelerators, field-programmable gate arrays (FPGAs), and/or other processing units to perform or facilitate performing operations on data, including performing calculations on data.

The data store 726 can store data structures (e.g., user data, metadata), code structure(s) (e.g., modules, objects, hashes, classes, procedures) or instructions, information relating to tensors, a network, nodes, edges, network structure, input data, output data, parameters, formulas or equations, calculations, network training, objective functions, simulated output data, updates to parameters, tensor-tensor layer evolution rules, defined network management criteria, algorithms (e.g., network management algorithms, network training algorithms, . . . ), data traffic flows (e.g., between components or devices, and/or across a network(s)), protocols, policies, interfaces, tools, and/or other information, to facilitate controlling operations associated with the network management component 700. In an aspect, the processor component 724 can be functionally coupled (e.g., through a memory bus or other bus) to the data store 726 in order to store and retrieve information desired to operate and/or confer functionality, at least in part, to the communicator component 702, operations manager component 704, format component 706, extractor component 708, parameter component 710, evolution component 712, calculator component 714, training component 716, simulator component 718, objective function component 720, update component 722, processor component 724, and/or data store 726, and/or other components of the network management component 700, and/or substantially any other operational aspects of the network management component 700.

Figure 8:
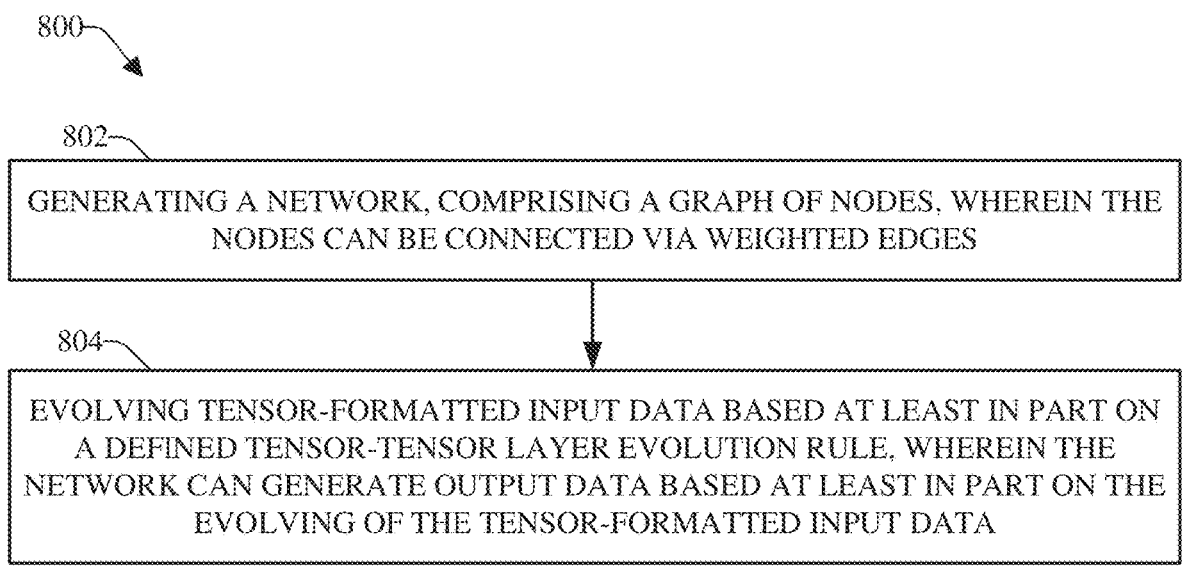
FIG. 8 illustrates a flow diagram of an example, non-limiting method for generating and managing neural networks (e.g., deep tensor neural networks) in accordance with various embodiments described herein.

FIG. 8 illustrates a flow diagram of an example, non-limiting method 800 for generating and managing neural networks (e.g., deep tensor neural networks) in accordance with various embodiments described herein. The method 800 can be performed by, for example, the processor component, the network management component, the network component, and/or the network. Repetitive description of like elements employed in other embodiments described herein is or may be omitted for sake of brevity.

At 802, a network, comprising a graph of nodes, can be generated, wherein the nodes can be connected via weighted edges. The network component can generate the network, which can comprise a set (e.g., graph) of nodes, wherein nodes of the network can be connected to other nodes via weight edges (e.g., edges associated with weight values). The network component and/or network management component can determine the weight values for the edges, wherein each edge can have its own weight value. The network can be activated by a set of non-linear activation functions.

At 804, tensor-formatted input data can be evolved based at least in part on a defined tensor-tensor layer evolution rule, wherein the network can generate output data based at least in part on the evolving of the tensor-formatted input data. The network management component can process (e.g., format) input data and parameters to generate the tensor-formatted input data as well as tensor-formatted parameters for use in the network in accordance with a desired tensor format. The desired tensor format can be based at least in part on the type of tensors (e.g., t-product, or an M-product, . . . ) being employed in the network.

The network (e.g., as managed by the network management component) can evolve the tensor-formatted input data (e.g., in the network) and/or the parameters associated with the network based at least in part on the defined tensor-tensor layer evolution rule. The network can generate output data based at least in part on the evolving of the tensor-formatted input data, and based at least in part on the parameters associated with the network. For instance, in response to inputting (e.g., applying) the tensor-formatted input data to the input nodes of the network, the resulting output data produced by the network can be based at least in part on the weights (e.g., weight values) applied to the edges of the network and the biases (e.g., bias values) of the network in accordance with the defined tensor-tensor layer evolution rule.

Figure 9:
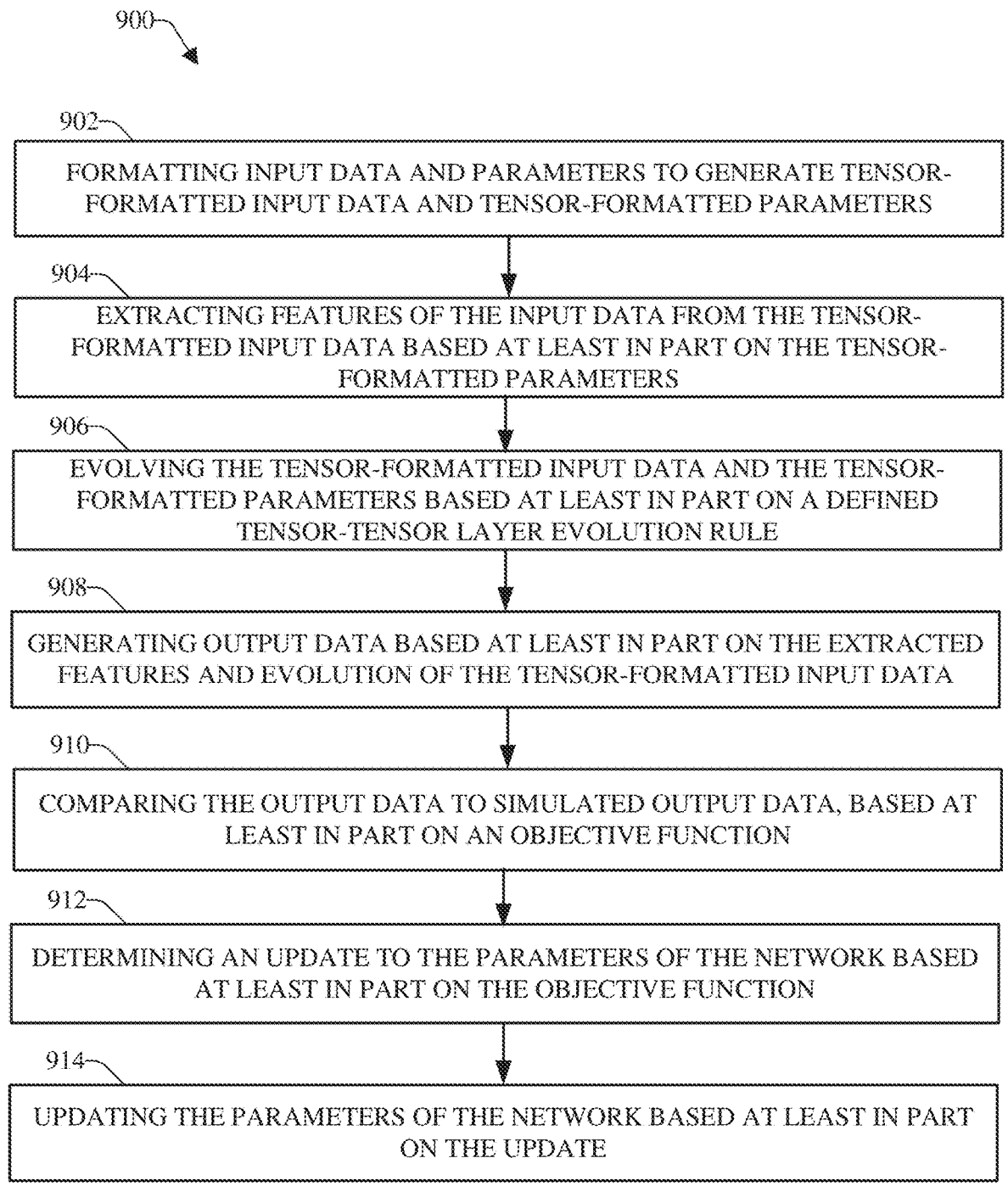
FIG. 9 depicts a flow diagram of an example, non-limiting method for generating, training, and managing neural networks (e.g., deep tensor neural networks) in accordance with various embodiments described herein.

FIG. 9 depicts a flow diagram of an example, non-limiting method 900 for generating, training, and managing neural networks (e.g., deep tensor neural networks) in accordance with various embodiments described herein. The method 900 can be performed by, for example, the processor component, the network management component, the network component, and/or the network. Repetitive description of like elements employed in other embodiments described herein is or may be omitted for sake of brevity.

At 902, input data and parameters can be formatted to generate tensor-formatted input data and tensor-formatted parameters. The network management component can format the input data and parameters (e.g., parameter data) to generate the tensor-formatted input data and tensor-formatted parameters (e.g., tensor-formatted parameter data) based at least in part on a defined tensor format. In some embodiments, the input data can comprise training data that can be utilized to facilitate training the network. In other embodiments, the input data can comprise data that can be processed and/or analyzed by the network to generate results as an output (e.g., output data) for use in one or more applications. The input data and/or the parameters can be received from a user, a database, or another data source. All or a portion of the input data can be multi-dimensional (e.g., 3-D, 4-D, ... ). The parameters can comprise, for example, weight parameters (e.g., weight values), which can be applied (e.g., by the network management component and/or the network component) to the edges of the network, and/or bias parameters (e.g., bias values) that can be applied to the network. The defined tensor format can relate to a t-product, an M-product, or other desired type of tensor-tensor product.

At 904, features of the input data can be extracted from the tensor-formatted input data based at least in part on the tensor-formatted parameters. The network can extract the features of the input data from the tensor-formatted input data based at least in part on the tensor-formatted parameters. The network and the network management component, in conjunction with the network component, can perform forward propagation of the input data (e.g., as formatted as tensor-formatted input data) to facilitate extracting the features of the input data, for example in accordance with the applicable equations (e.g., equations relating to forward propagation) disclosed herein. The features can comprise or relate to, for example, image features, facial features, objects, object features (e.g., shape, size, texture, ... , of objects), correlations between items of data, and/or other types of features. In some embodiments, the network management component and/or the network can extract the features of the input data from the tensor-formatted input data in parallel.

At 906, the tensor-formatted input data and the tensor-formatted parameters can be evolved based at least in part on a defined tensor-tensor layer evolution rule. The network (e.g., as managed by the network management component) can evolve the tensor-formatted input data and the tensor-formatted parameters (e.g., in the network) based at least in part on (e.g. in accordance with) the defined tensor-tensor layer evolution rule.

At 908, output data can be generated based at least in part on the extracted features and evolution of the tensor-formatted input data. The network (e.g., as managed by the network management component) can generate output data based at least in part on the extracted features obtained from the tensor-formatted input data and the evolution of the tensor-formatted input data as well as the weights (e.g., weight values) applied to the edges of the network and the biases (e.g., bias values) of the network.

At 910, the output data can be compared to simulated output data, based at least in part on an objective function. The network management component can compare the output data from the network to the simulated output data, based at least in part on the objective function (e.g., error or loss function). In some embodiments, the network management component can determine (e.g., calculate) the objective function based at least in part on (e.g., as a function of) the output data and the simulated output data (e.g., the difference between the output data and the simulated output data).

At 912, an update to the parameters of the network can be determined based at least in part on the objective function. The network management component can back-propagate information relating to the objective function, by application of tensor-tensor operations, to evolve the parameters (e.g., tensor-formatted parameters) and facilitate determining the update to the parameters. For instance, the network management component can determine the update to the parameters based at least in part on (e.g., as a function of) the determined objective function. The parameters can comprise, for example, weights of the edges of the network and/or biases of the network.

At 914, the parameters of the network can be updated based at least in part on the update. The network management component can update the parameters (e.g., weights, biases) of the network based at least in part on the determined update for the parameters. When the method 900 is employed to train the network, the training of the network can be performed iteratively until the network is sufficiently trained to satisfy the defined network management criteria (e.g., network management criteria relating to training and performance of the network).

Figure 10:
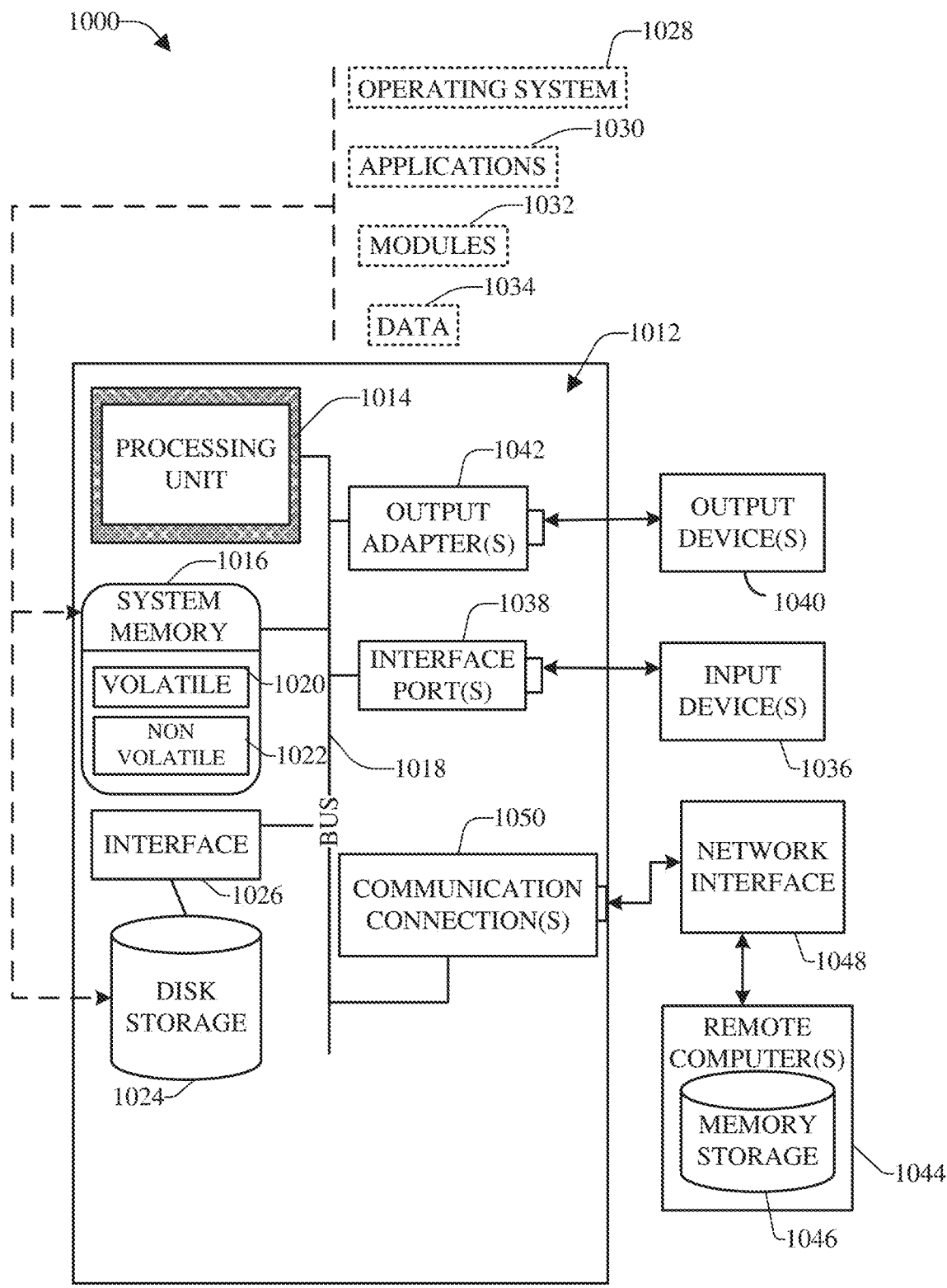
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is or may be omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments may be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer-executable components; and
    a processor, operatively coupled to the memory, that executes computer-executable components, the computer-executable components comprising:
        a network component that generates a neural network comprising a graph of nodes connected via weighted edges; and
        a network management component that:
            in response to the neural network receiving input data and parameters, formats the input data and the parameters to generate tensor-formatted input data and tensor-formatted parameters, and wherein at least a portion of the input data is multi-dimensional data,
            extracts a first portion of features from the tensor-formatted input data in parallel with extraction of a second portion of the features from the tensor-formatted input data, and
            trains the neural network using a Hamiltonian forward propagation process to evolve the tensor-formatted input data based on a defined tensor-tensor layer evolution rule, wherein the neural network generates output data based on the evolution of the tensor-formatted input data, and wherein the Hamiltonian forward propagation process comprises a multiplication of a circulant function of a first antisymmetric matrix and an unfold function of a second matrix.

2. The system of claim 1, wherein the neural network is a deep tensor neural network, wherein the deep tensor neural network is activated by a set of non-linear activation functions, and wherein the weighted edges and the set of non-linear activation functions operate, based on tensor-tensor functions, to evolve the tensor-formatted input data.

3. The system of claim 1, wherein the network management component applies weights to edges to generate the weighted edges, wherein the weights are applied to the edges via a tensor-tensor product or a multiply type of the tensor-tensor product.

4. The system of claim 1, wherein the network management component receives a portion of the parameters via an interface from a user, and wherein the portion of the parameters is selected from a group of defined parameters consisting of a defined constant value, a defined network structure, and a non-linear activation function.

5. The system of claim 1, wherein a portion of the tensor-formatted input data is tensor-formatted training data.

6. The system of claim 1, wherein a portion of the output data is output training data derived from inputting tensor-formatted training data to the neural network, and wherein the network management component compares the output training data to simulated output data, based on a defined loss function, to determine an update to perform on the neural network to improve operation of the neural network.

7. The system of claim 6, wherein the network management component updates the neural network, based on the update, by application of a set of tensor-tensor operations via back-propagation.

8. The system of claim 7, wherein, as part of performing the update, the network management component updates a weight of a weighted edge of the weighted edges and updates a parameter of a non-linear activation function of the neural network.

9. A computer-implemented method, comprising:
generating, by a system operatively coupled to a processor, a neural network comprising a graph of nodes connected via weighted edges;
in response to the neural network receiving input data and parameters, formatting, by the system, the input data and the parameters to generate tensor-formatted input data and tensor-formatted parameters, and wherein at least a portion of the input data is multi-dimensional data;
extracting, by the system, a first portion of features from the tensor-formatted input data in parallel with extraction of a second portion of the features from the tensor-formatted input data; and
training, by the system, the neural network using a Hamiltonian forward propagation process to evolve the tensor-formatted input data based on a defined tensor-tensor layer evolution rule, wherein the neural network generates output data based on the evolving of the tensor-formatted input data, wherein the Hamiltonian forward propagation process comprises a multiplication of a circulant function of a first antisymmetric and an unfold function of a second matrix.

10. The computer-implemented method of claim 9, further comprising:
activating, by the system, the neural network based on a set of non-linear activation functions, wherein the weighted edges and the set of non-linear activation functions operate, based on tensor-tensor functions, to perform the evolving of the tensor-formatted input data.

11. The computer-implemented method of claim 9, further comprising:
applying, by the system, weights to edges, based on a tensor-tensor product or a multiply type of the tensor-tensor product, to generate the weighted edges.

12. The computer-implemented method of claim 9, wherein a portion of the tensor-formatted input data is tensor-formatted training data, wherein a portion of the output data is output training data, and further comprising:
applying, by the system, the tensor-formatted training data to the neural network to generate the output training data; and
comparing, by the system, the output training data to simulated output data, based on a defined loss function, to determine an update to perform on the neural network to enhance operation of the neural network.

13. The computer-implemented method of claim 12, further comprising:
modifying, by the system, the neural network, based on the update, by applying a set of tensor-tensor operations via back-propagation, wherein the modifying the neural network comprises modifying a weight value of a weighted edge of the weighted edges, and modifying a parameter of a non-linear activation function of the neural network.

14. A computer program product that facilitates creating a deep tensor neural network, the computer program product comprising a computer readable storage medium having program instructions embodied therewith, the program instructions are executable by a processor to cause the processor to:
create the deep tensor neural network comprising a graph of nodes connected via weighted edges;
in response to the neural network receiving input data and parameters, format the input data and the parameters to generate tensor-formatted input data and tensor-formatted parameters, and wherein at least a portion of the input data is multi-dimensional data;
extract a first portion of features from the tensor-formatted input data in parallel with extraction of a second portion of the features from the tensor-formatted input data; and
training the deep tensor neural network using a Hamiltonian forward propagation process to evolve tensor-structured input data applied to the deep tensor neural network based on a defined tensor-tensor layer evolution rule, wherein the deep tensor neural network generates output data based on the evolving of the tensor-structured input data, wherein the Hamiltonian forward propagation process comprises a multiplication of a circulant function of a first antisymmetric and an unfold function of a second matrix.

15. The computer program product of claim 14, wherein the program instructions are executable by the processor to cause the processor to:
activate the deep tensor neural network based on a set of non-linear activation functions, wherein the weighted edges and the set of non-linear activation functions operate, based on tensor-tensor functions, to perform the evolution of the tensor-structured input data.

16. The computer program product of claim 14, wherein the program instructions are executable by the processor to cause the processor to:
apply weights to edges, based on a tensor-tensor product or a multiply type of the tensor-tensor product, to generate the weighted edges.

17. The computer program product of claim 14, wherein the program instructions are executable by the processor to cause the processor to:
receive a portion of the parameters via an interface from a user, and wherein the portion of the parameters is selected from a group of defined parameters consisting of a defined constant value, a defined network structure, and a non-linear activation function.

18. The computer program product of claim 14, wherein a portion of the output data is output training data derived from inputting tensor-structured training data to the neural network, and wherein the program instructions are executable by the processor to cause the processor to:
  compare the output training data to simulated output data, based on a defined loss function, to determine an update to perform on the neural network to improve operation of the neural network.

19. The computer program product of claim 18, wherein the program instructions are executable by the processor to cause the processor to:
  update the neural network, based on the update, by application of a set of tensor-tensor operations via back-propagation.

20. The computer program product of claim 19, wherein the update updates a weight of a weighted edge of the weighted edges and updates a parameter of a non-linear activation function of the neural network.

* * * * *